Feb. 12, 1952 E. M. DELORAINE 2,584,987

PULSE DELAY COMMUNICATION SYSTEM

Original Filed Nov. 14, 1945 12 Sheets-Sheet 1

INVENTOR.
EDMUND M. DELORAINE
BY
R. H. Morris
ATTORNEY

Feb. 12, 1952 E. M. DELORAINE 2,584,987
PULSE DELAY COMMUNICATION SYSTEM
Original Filed Nov. 14, 1945 12 Sheets-Sheet 2

INVENTOR.
EDMUND M. DELORAINE
BY
R.P. Morris
ATTORNEY

Feb. 12, 1952 E. M. DELORAINE 2,584,987

PULSE DELAY COMMUNICATION SYSTEM

Original Filed Nov. 14, 1945 12 Sheets-Sheet 3

INVENTOR.
EDMUND M. DELORAINE

BY

R P Morris
ATTORNEY

Feb. 12, 1952 E. M. DELORAINE 2,584,987

PULSE DELAY COMMUNICATION SYSTEM

Original Filed Nov. 14, 1945 12 Sheets-Sheet 4

INVENTOR.
EDMUND M. DELORAINE

BY

R P Morris
ATTORNEY

Feb. 12, 1952 E. M. DELORAINE 2,584,987

PULSE DELAY COMMUNICATION SYSTEM

Original Filed Nov. 14, 1945 12 Sheets-Sheet 5

INVENTOR.
EDMUND M. DELORAINE
BY
R. P. Morris
ATTORNEY

Feb. 12, 1952 E. M. DELORAINE 2,584,987

PULSE DELAY COMMUNICATION SYSTEM

Original Filed Nov. 14, 1945 12 Sheets-Sheet 6

INVENTOR.
EDMUND M. DELORAINE

BY

R P Morris

ATTORNEY

INVENTOR.
EDMUND M. DELORAINE
BY
R P Morris
ATTORNEY

Feb. 12, 1952 E. M. DELORAINE 2,584,987

PULSE DELAY COMMUNICATION SYSTEM

Original Filed Nov. 14, 1945 12 Sheets-Sheet 8

INVENTOR.
EDMUND M. DELORAINE

BY

R P Morris
ATTORNEY

*INVENTOR.*
EDMUND M. DELORAINE
*BY*
R P Morris
*ATTORNEY*

INVENTOR.
EDMUND M. DELORAINE
BY
R. F. Morris
ATTORNEY

INVENTOR.
EDMUND M. DELORAINE
BY
ATTORNEY

INVENTOR.
EDMUND M. DELORAINE
BY
R. P. Morris
ATTORNEY

Patented Feb. 12, 1952 2,584,987

UNITED STATES PATENT OFFICE 2,584,987

PULSE DELAY COMMUNICATION SYSTEM

Edmond M. Deloraine, New York, N. Y., assignor to Federal Telephone and Radio Corporation, New York, N. Y., a corporation of Delaware Continuation of application Serial No. 628,613, November 14, 1945. This application May 13, 1950, Serial No. 161,831

56 Claims. (Cl. 179—18)

This application is a continuation of my copending application, Serial No. 628,613, filed November 14, 1945, now abandoned.

This invention relates to communication systems and more particularly to exchange systems for use in telephony.

In telephone systems generally in use, interconnection between subscribers' lines through the various trunking lines in telephone exchange requires considerable mechanical switching and a large plant set up. Furthermore, large numbers of interconnecting lines are generally required in the exchange so that connection may be made between any two lines incoming into the system. Likewise, considerable complication is presented in the signalling system for line selections and ringing.

Some replacement of mechanical switching systems by electronic switches have been proposed but, in general, all of these systems require still the mechanical selection of lines for interconnection. The electronic switches as proposed generally are used simply to replace some of the mechanical switches in the system. Furthermore, ringing and other signalling is carried through conventional switching circuits in the same manner as in the telephone systems generally in use.

It is an object of my invention to provide a switching circuit for interconnection of channels wherein substantially all the signalling as well as the communication may be carried through electronic switching means.

It is a further object of my invention to provide a switching system for interconnecting any two channels of a plurality of channels for transfer of communication in which each of the channels is given a predetermined time spacing and interconnection is effected by effectively delaying the indication signals a predetermined amount equal to substantially the difference in time position assigned to the channels to be interconnected.

It is a still further object of my invention to provide an exchange system in which each of a plurality of channels is connected to a common distributor unit which serves successively to scan the lines so that each has a predetermined time position in the scanning cycle and to produce in response to signals of any one channel a time displacement equal substantially to the time displacement between the channels to be interconnected so that the signals may be properly redistributed to this output channel.

It is still a further object of my invention to provide an exchange system in which each of a plurality of lines for transferring communication signals is allotted a predetermined position in a distributor scanning cycle so that signals from all the lines in operation are reproduced in parallel, for example in time displaced relation, on a common interconnecting medium and in which these communication signals are delayed a proper amount so that upon reapplication to the distributor system they will be applied to a selected other one of the lines of the system.

In a system according to my invention, a number of communication channels, dependent upon the number of trunking selectors provided in the system, can be interconnected for simultaneous conversations. Furthemore, the system is extremely simple so far as equipment is concerned and permits the construction of telephone exchanges without tremendous outlays of equipment. Furthermore, in such a system it is not essential that a large central exchange be maintained but individual smaller exchanges may be installed in different centers of population as required, the whole system then being capable of interconnection to cover a large area.

In accordance with a feature of my invention, the signal or speech currents in the various lines or other channels may be replaced at the exchange by a series of narrow pulses of amplitude corresponding to the amplitude of the original current at the corresponding time. The pulses are produced at sufficient rapidity so that they define substantially the signal envelope. In this manner by allotting different time positions to each line, the signal or voice currents within the exchange may be distributed over a common channel each signal being repeated by a series of pulses displaced in time in accordance with the distributor time position. This distribution may be readily accomplished by means of a cathode ray tube serving as a distributor which will sequentially scan the lines connected to predetermined terminals and respond if there is a signalling voltage on the line. The channels may be separated by time selection and may be applied through time displacement means and a low-pass filter which serves to reproduce the audio envelope to the same or another distributor also coupled to the lines. The incoming signals may serve to adjust the time displacement means so that they will represent the time difference between the time position of the calling line and the selected called line. The time displacement means may be an actual delay line of some form or an equivalent circuit which, while not producing an actual delay of the signals, will effectively serve to store the energy and release it after a predetermined interval equal to the desired delay. In this manner, the interconnection of any one line with any other line of the system may be accomplished. Upon making this interconnection, the communication signals may pass through the same delay means between the interconnected lines. Furthermore, since the scanning cycle covers each of the lines connected to the distributor, as many simultaneous connections may be made as there are time displacement trunking channels within the exchange.

Preferably, means are provided responsive to the interconnection of the lines to tie up these lines so that they cannot be selected by another subscriber attempting to get the connection. If desired, any conventional type of busy signal may be applied to the subscriber's line when this condition exists so that he will know that he must wait an interval for the line to become free so that he can make the desired connection.

While I have broadly outlined certain objects and features of my invention a better understanding of my invention and the objects and features thereof may be had from the particular description of an embodiment and certain modifications thereof made with reference to the accompanying drawings, in which.

Figure 4:
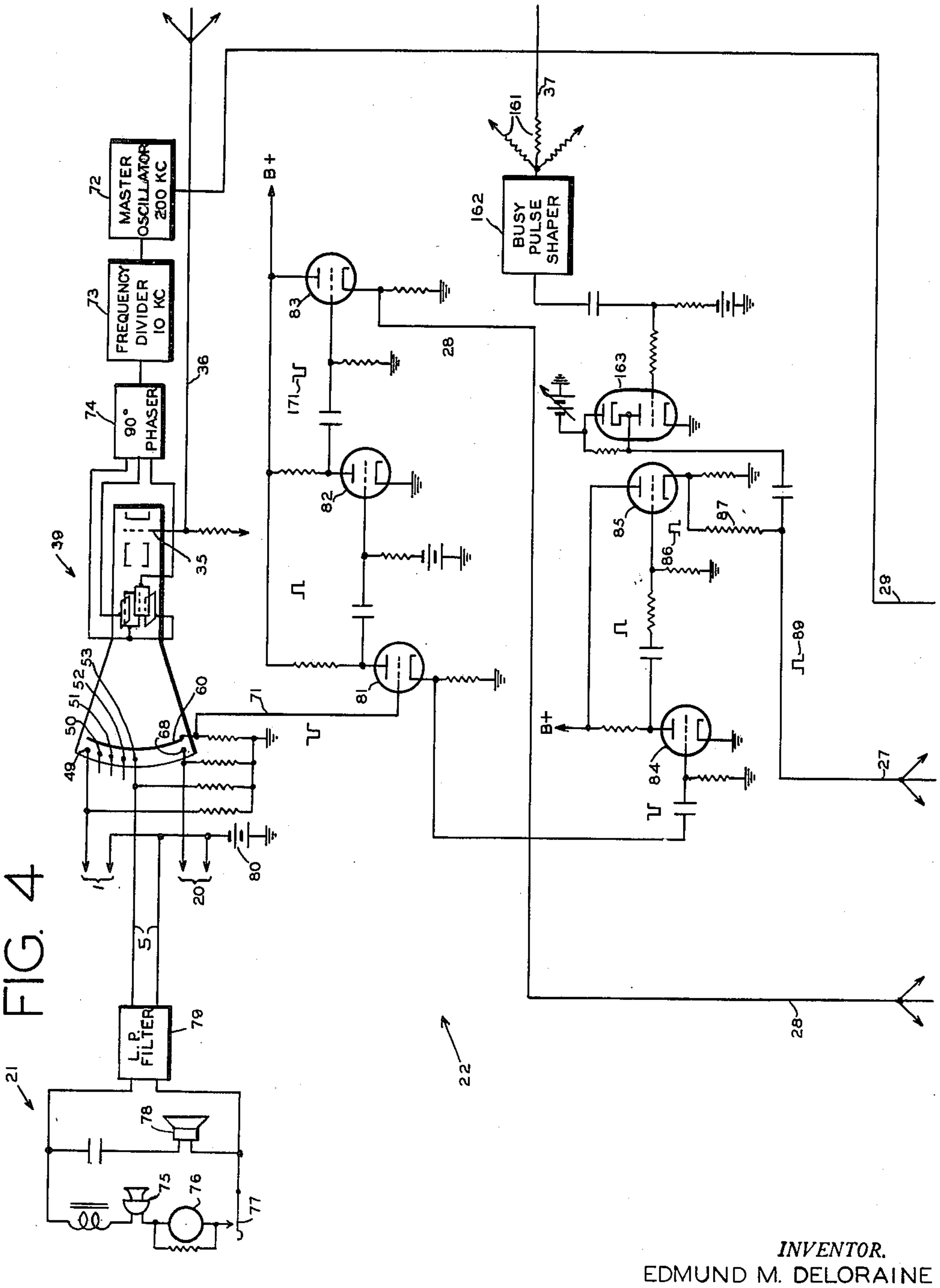

Figs. 4 to 8 inclusive, constitute a circuit diagram of a link exchange in accordance with my invention;

Fig. 4 illustrating the common equipment.

Figure 5:
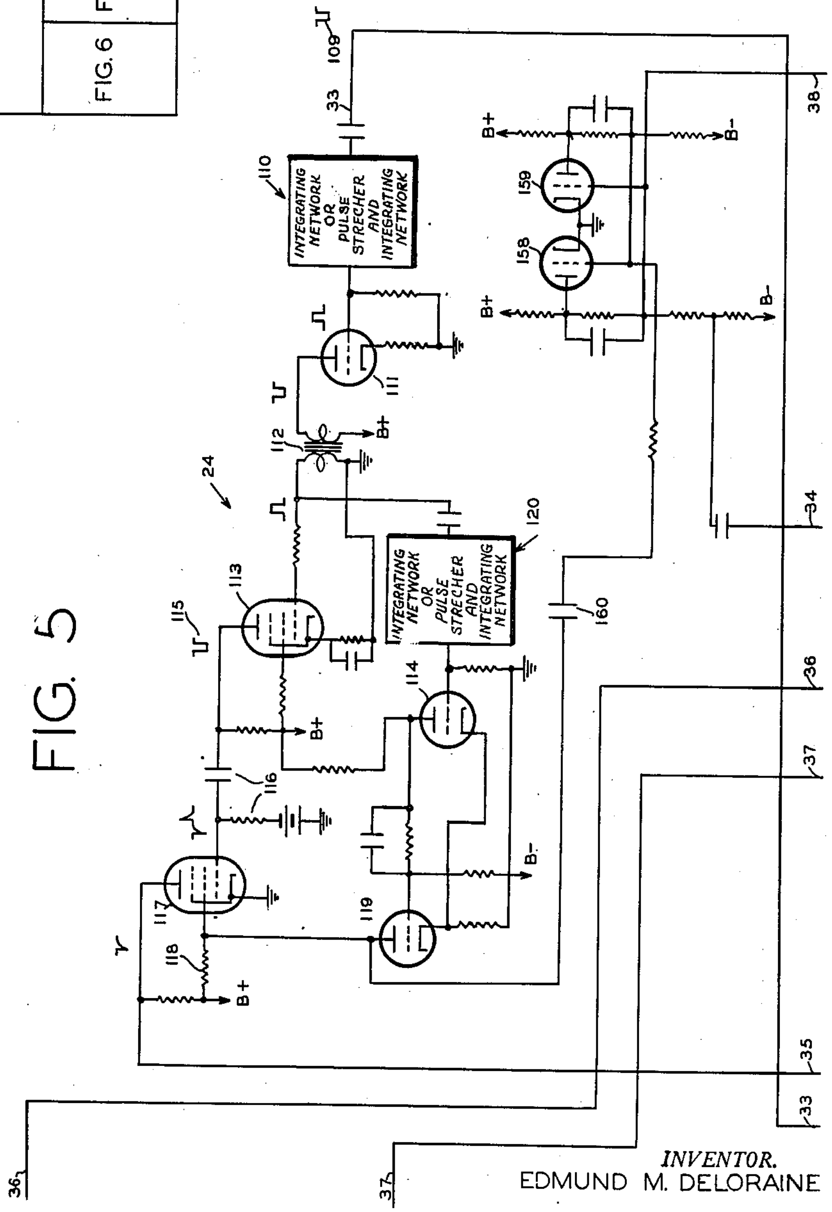

Fig. 5 showing the pulse forming equipment.

Figure 6:
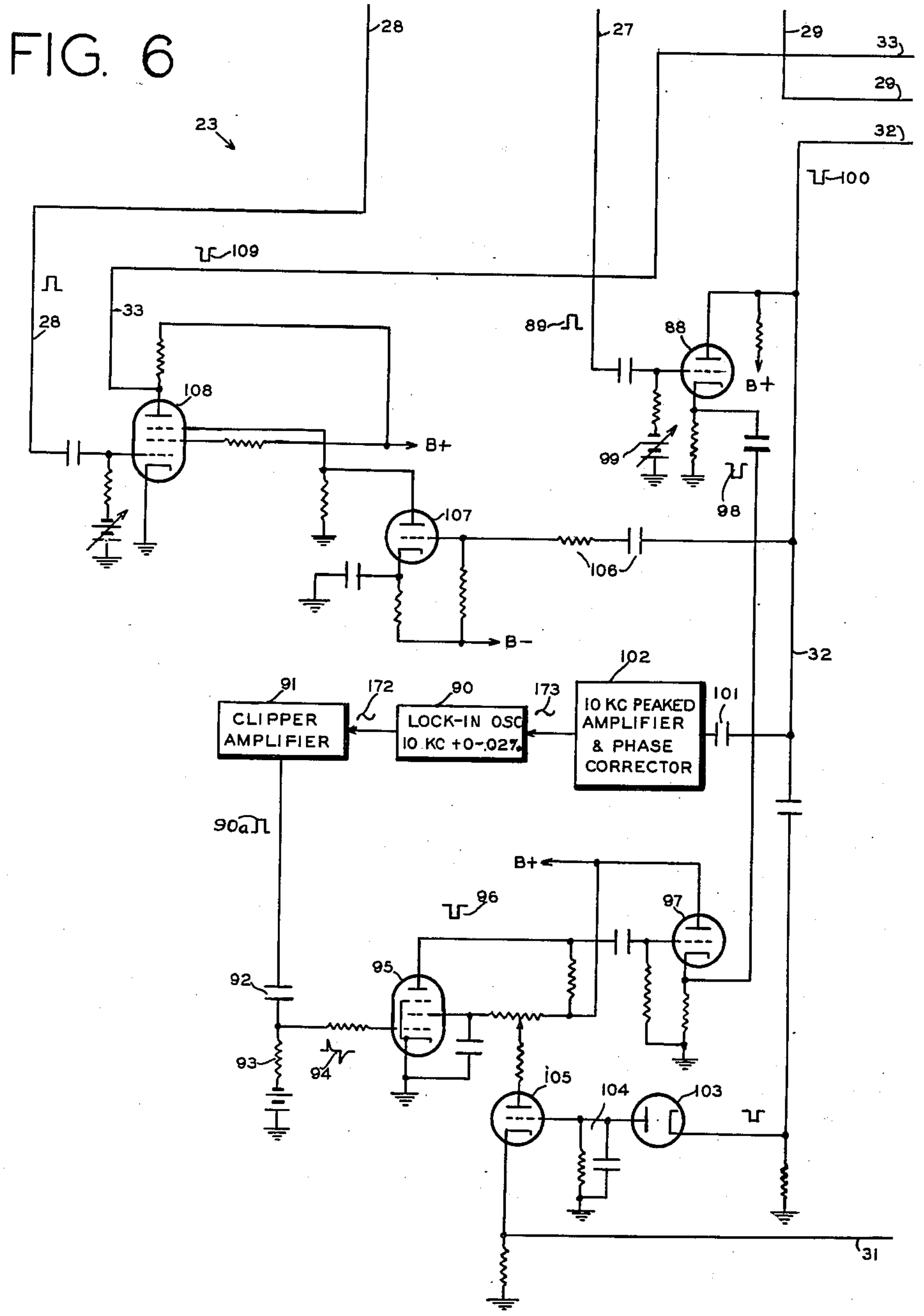

Fig. 6 the line finder equipment.

Figure 7:
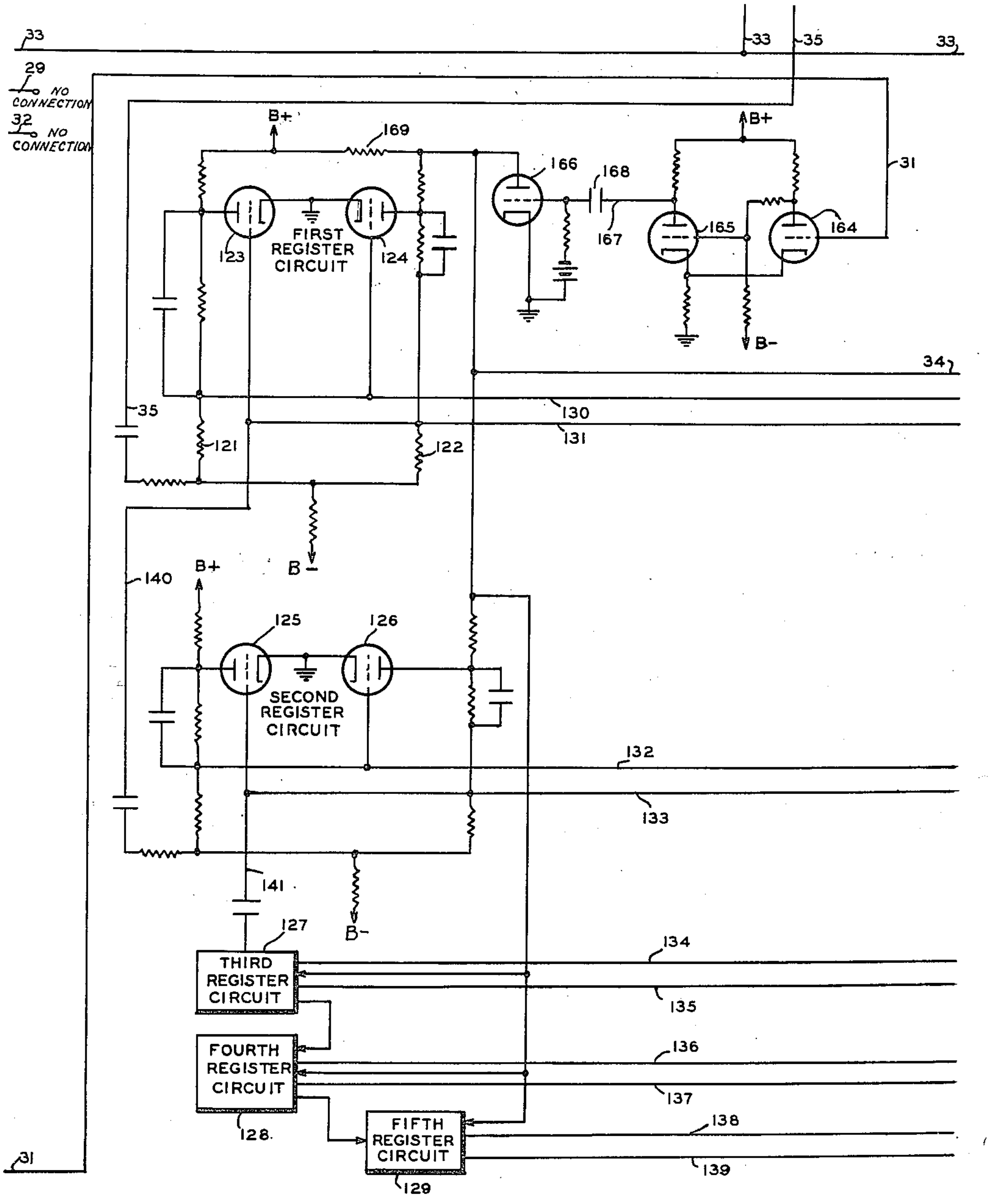

Fig. 7 the dial register equipment, and

Figure 9:
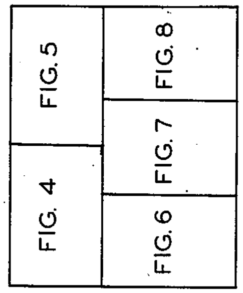
Figure 8:
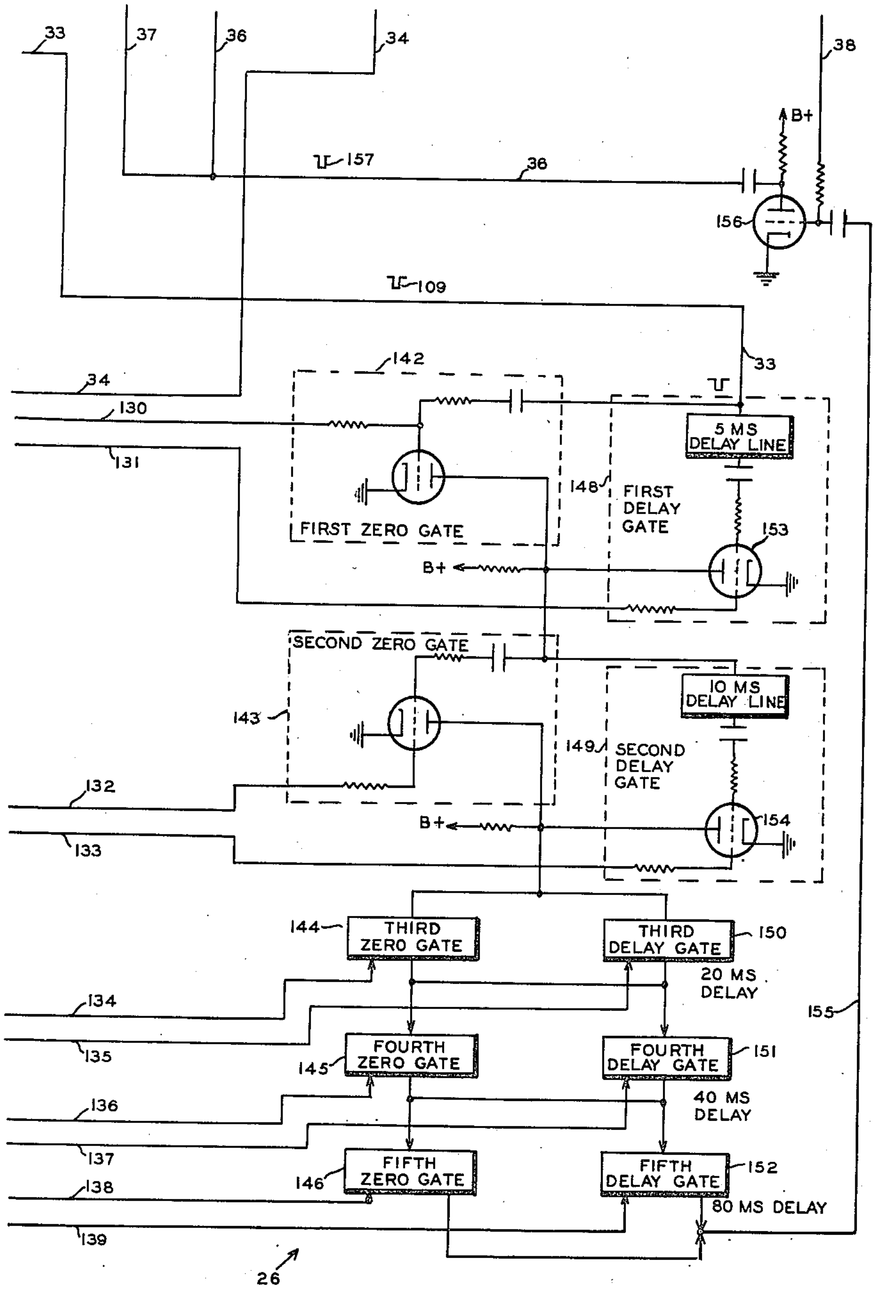
Figure 10:
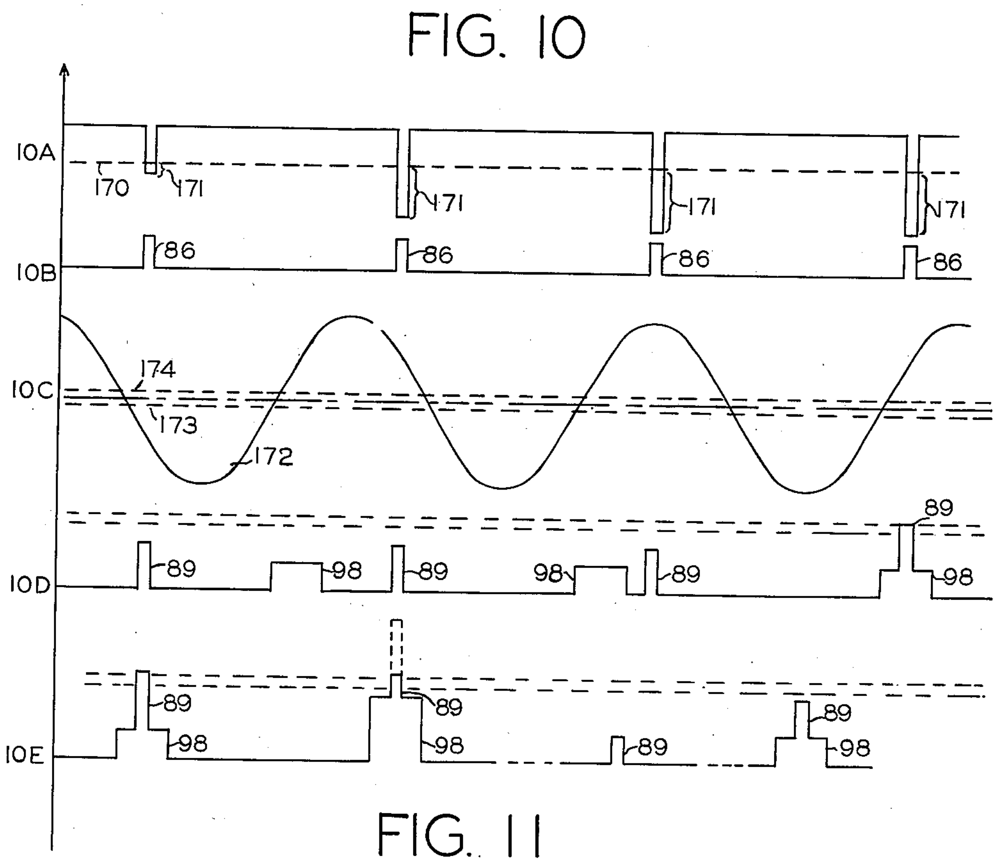
Figure 11:
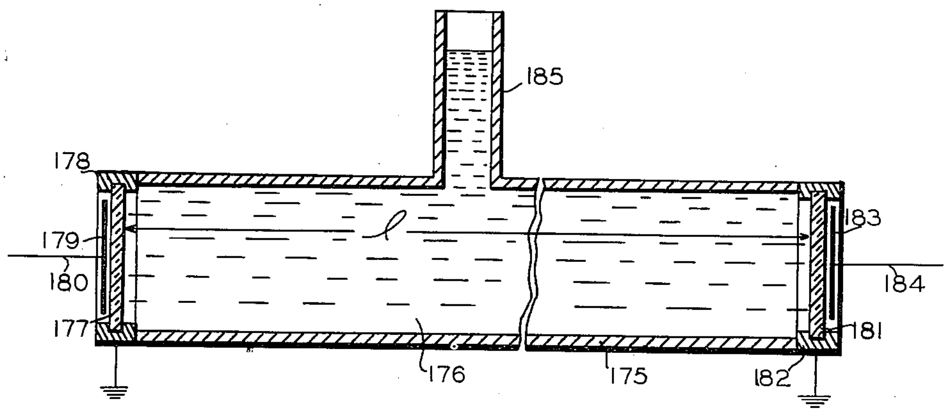
Figure 12:
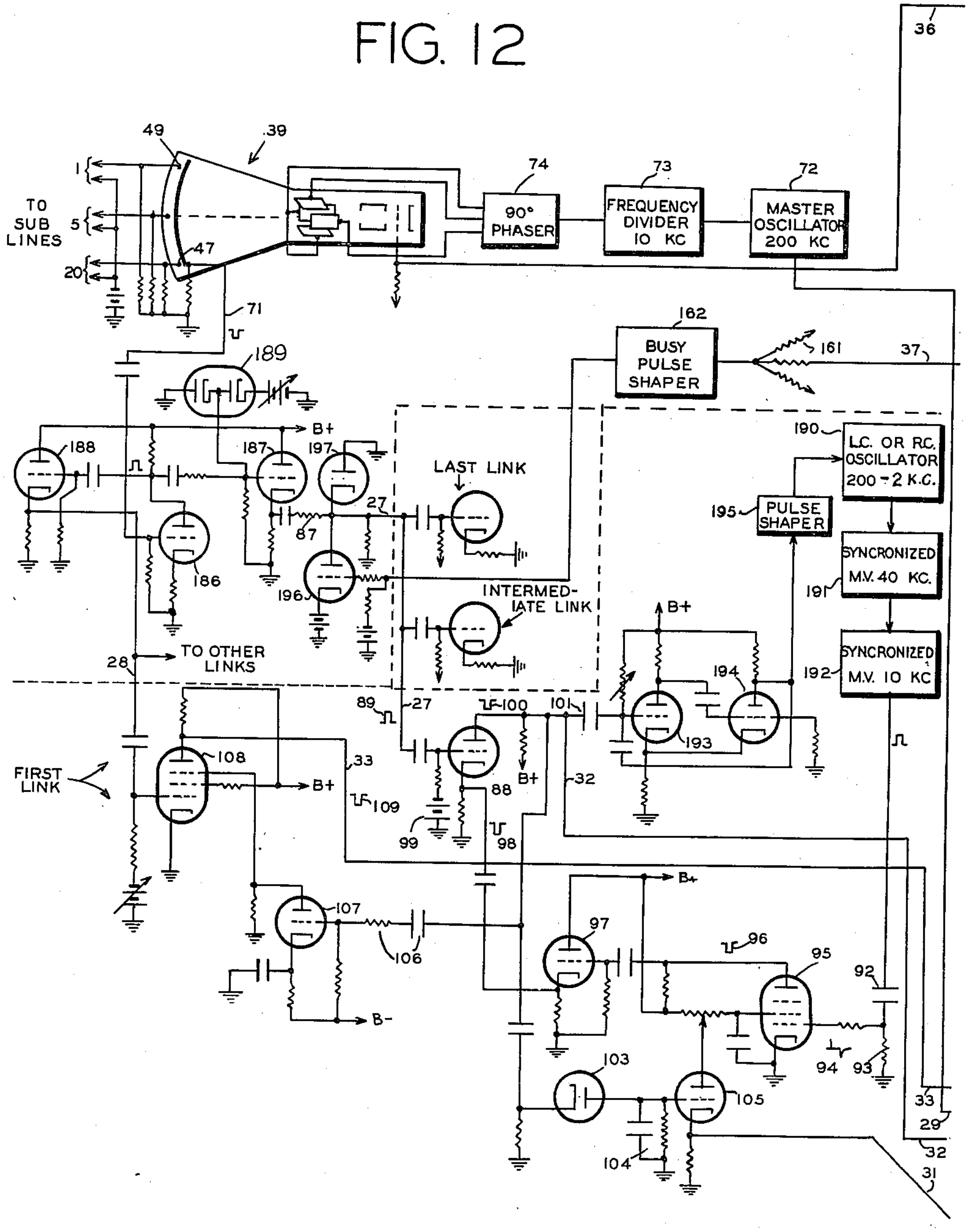
Figure 13:
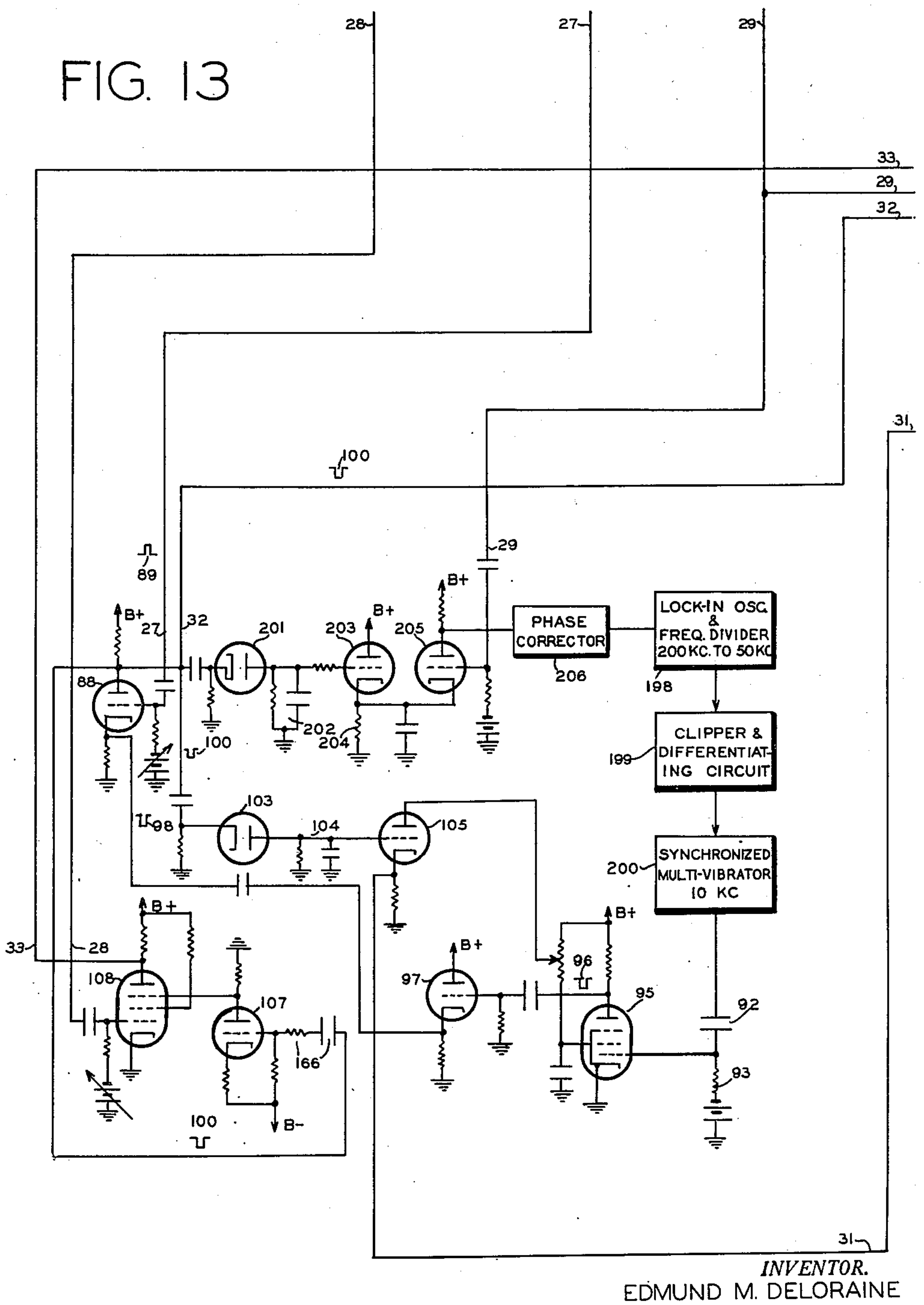
Figure 17:
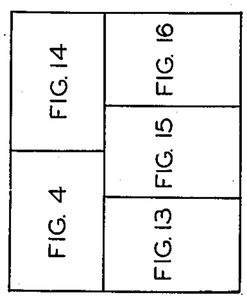
Figure 14:
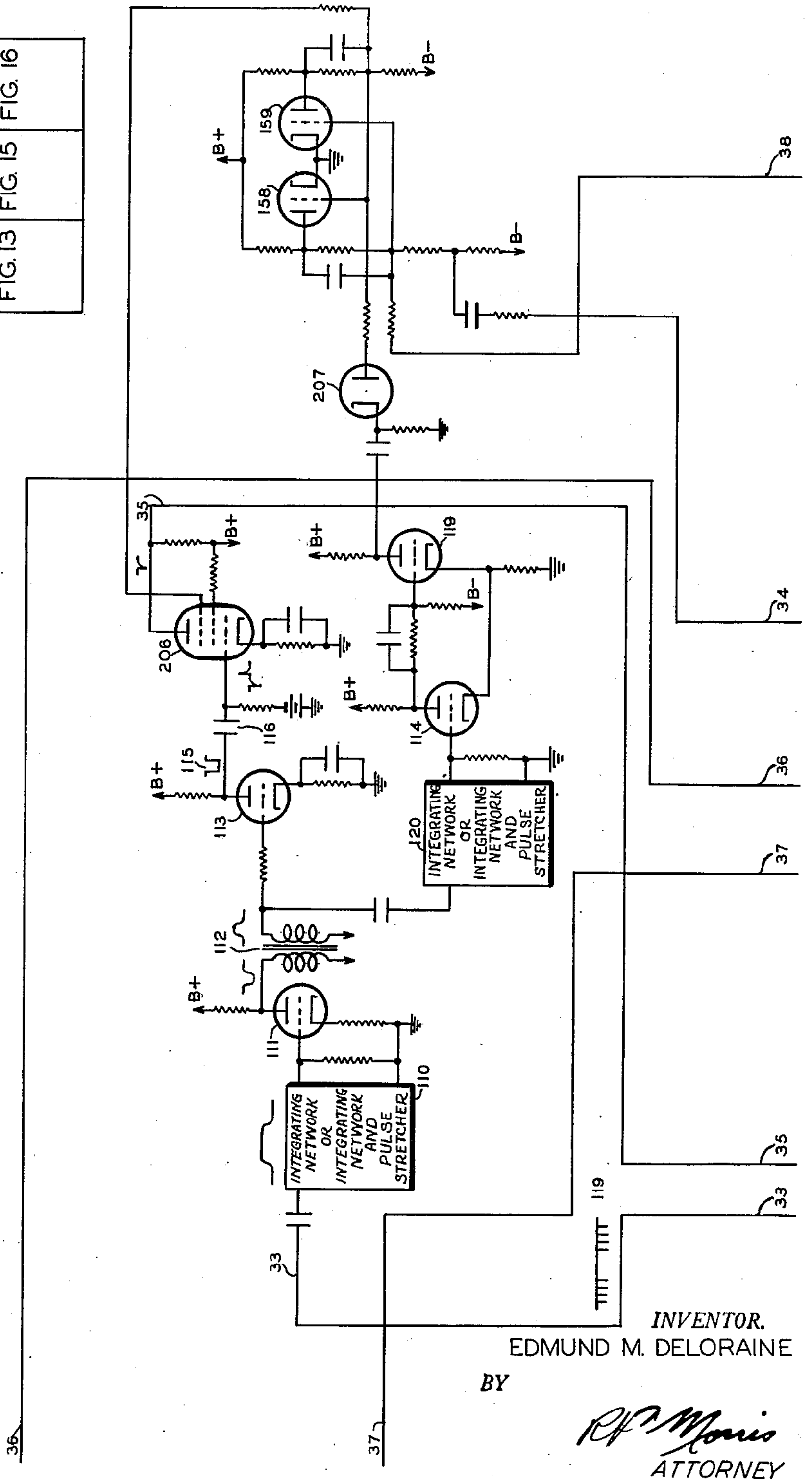
Figure 15:
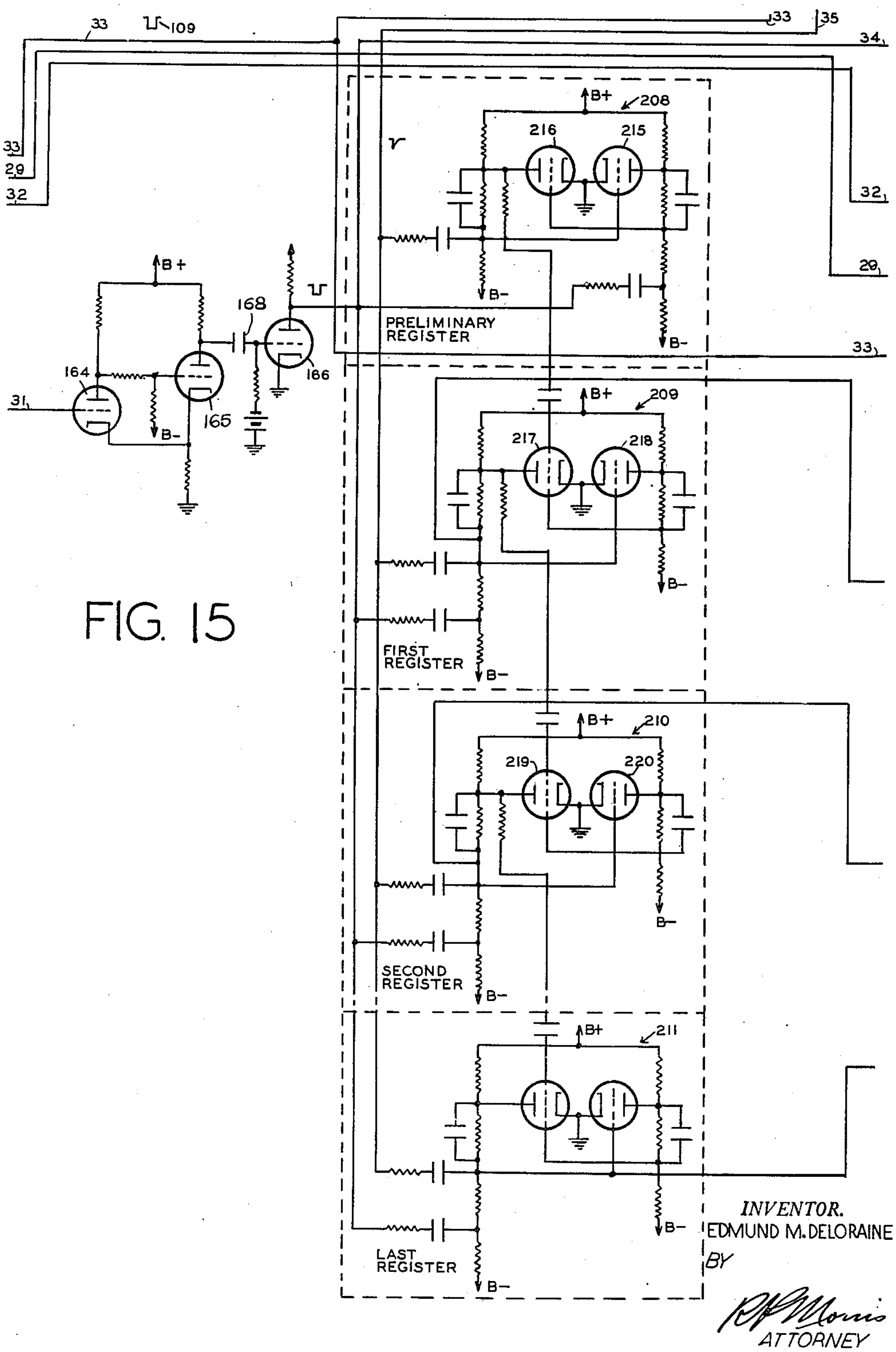
Figure 16:
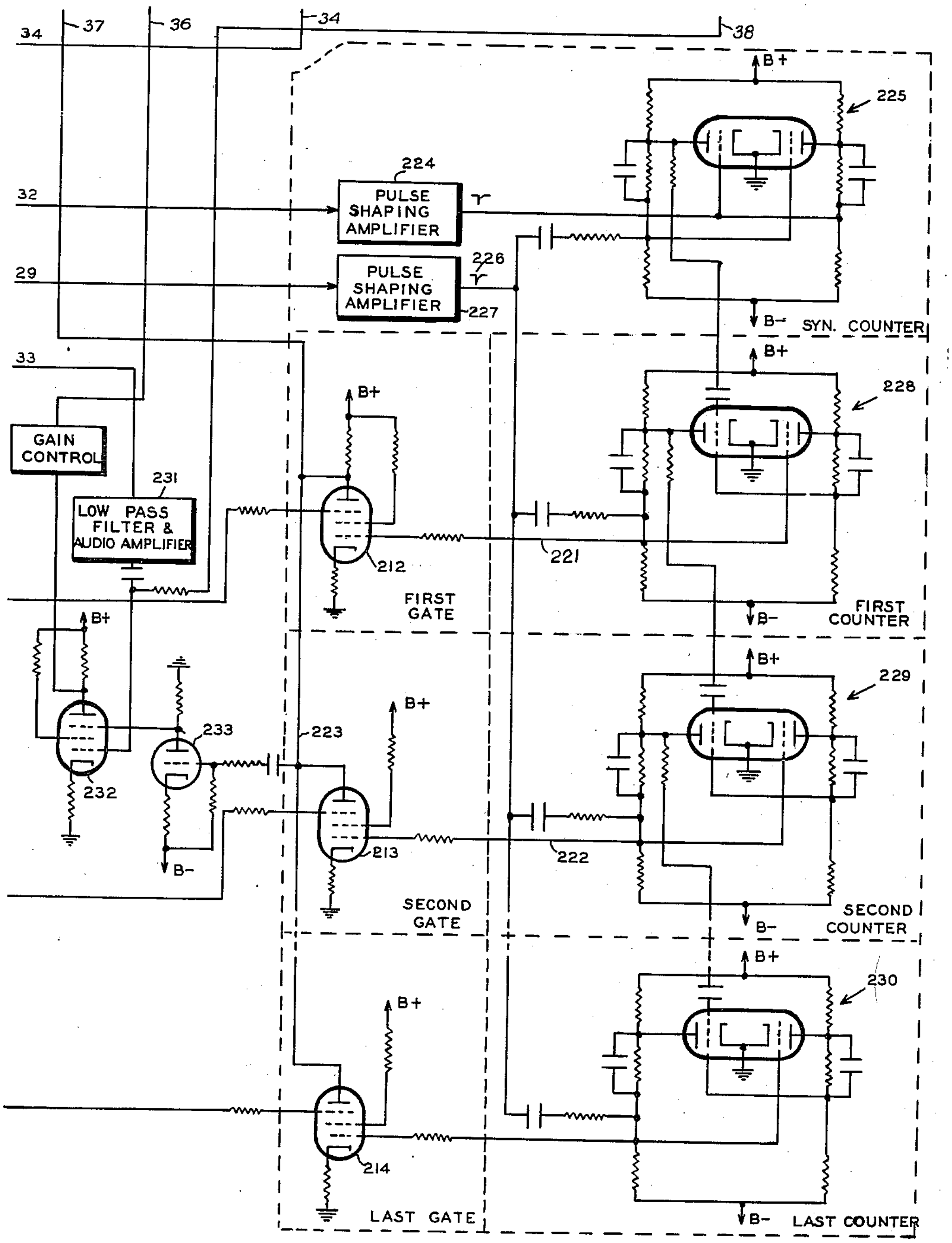

Fig. 8 the line selecting equipment;

Fig. 9 is a diagram illustrating how Figs. 4 to 8 inclusive, should be arranged to illustrate the complete circuit;

Fig. 10 is a set of curves used in explaining the operation of certain parts of the system;

Fig. 11 is a diagram in section of a delay line suitable for use in the equipment shown in Fig. 8;

Fig. 12 is an alternative form of circuit including both a common equipment and a line finder circuit which may be substituted as a whole for Figs. 4 and 6 in accordance with my invention;

Fig. 13 is an alternative type of line finder circuit which may be substituted for the circuit of Fig. 6 in accordance with my invention;

Fig. 14 is an alternative form of pulse forming circuit which may be substituted for the circuit of Fig. 5;

Figs. 15 and 16 are respectively, alternative forms of dial register and line selecting circuits which may be substituted as a whole for the two circuits of Figs. 7 and 8; and Fig. 17 is a diagram illustrating how Figs. 4, 12, 14, 15 and 16 should be arranged to illustrate the preferred alternative combinations of circuits of my invention.

Figure 1:
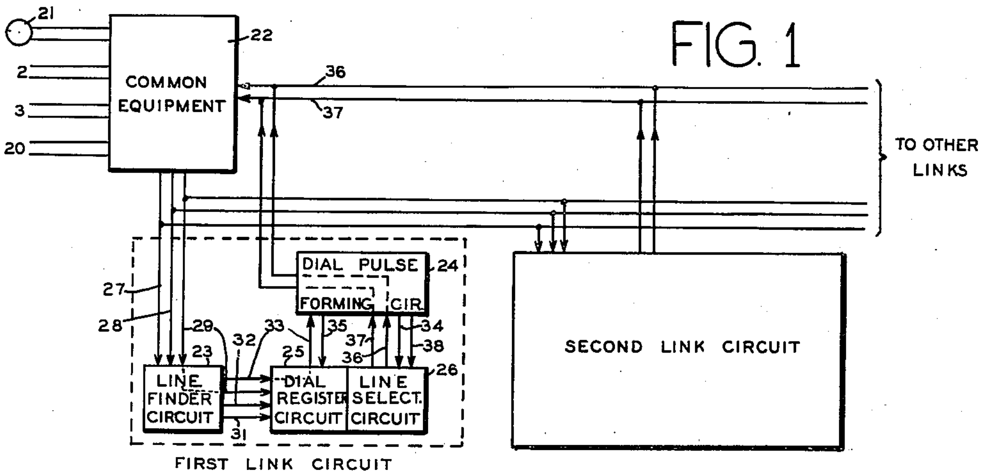
Fig. 1 is a block diagram illustrating the general circuit set up.

In an example of my system as outlined above, the system may be divided into three parts as shown in Fig. 1; first, all the subscribers' lines, twenty for example, assigned numerals 1 to 20, each of these lines having a subscriber subset equipment such as 21; second, the equipment common to all line circuits, hereafter referred to as common equipment 22; and third, a group of link circuits one of which is needed for each simultaneous call. Each of the link circuits may be further sub-divided into line finder circuit 23, dial pulse forming circuit 24, dial register circuit 25 and line selecting circuit 26. These several major components are interconnected by wires 27–38 inclusive, as shown in Fig. 1. For the sake of simplicity in the description only one-way conversation is provided for.

As shown, all lines 1 to 20 terminate in common equipment 22. This equipment 22 performs a scanning function, preferably by means of a suitable tube having an electronic beam which sweeps each of the lines in turn.

When one of these lines has a potential indicative of a calling condition, the common equipment 22 applies signals over wires 27 and 28 to all the link circuits in parallel and specifically to the line finder circuit 23 of the first link (chosen for discussion). This line finder 23 operates to find the calling line and transfer the signals over wire 33 to the dial pulse forming circuit 24.

When dialing ensues, this circuit 24 produces dial pulses which are counted and stored in dial register circuit 25. The dial pulse register 25 then serves to control the line selector circuit 26 which may comprise a delay line or other time displacement apparatus.

The incoming speech signals are then transferred from common equipment 22 over wire 28, line finder circuit 23, wire 33, line selector circuit 26 and thence over wire 36 back to the common equipment 22 from whence they are applied to the selected outgoing line. The part of Fig. 1 comprising line finder 23, dial pulse forming circuit 24, dial register 25 and line selector circuit 26 may be considered together as a link circuit. For certain embodiments of the system, a synchronizing frequency may be fed from common equipment 22 over lead 29 to line selector circuit 26 and line finder circuit 23 respectively. The five leads 27, 28, 29, 36 and 37 to and from common equipment 22 may also be multiplied to other link circuits of the system as shown.

Figures 2, 3:
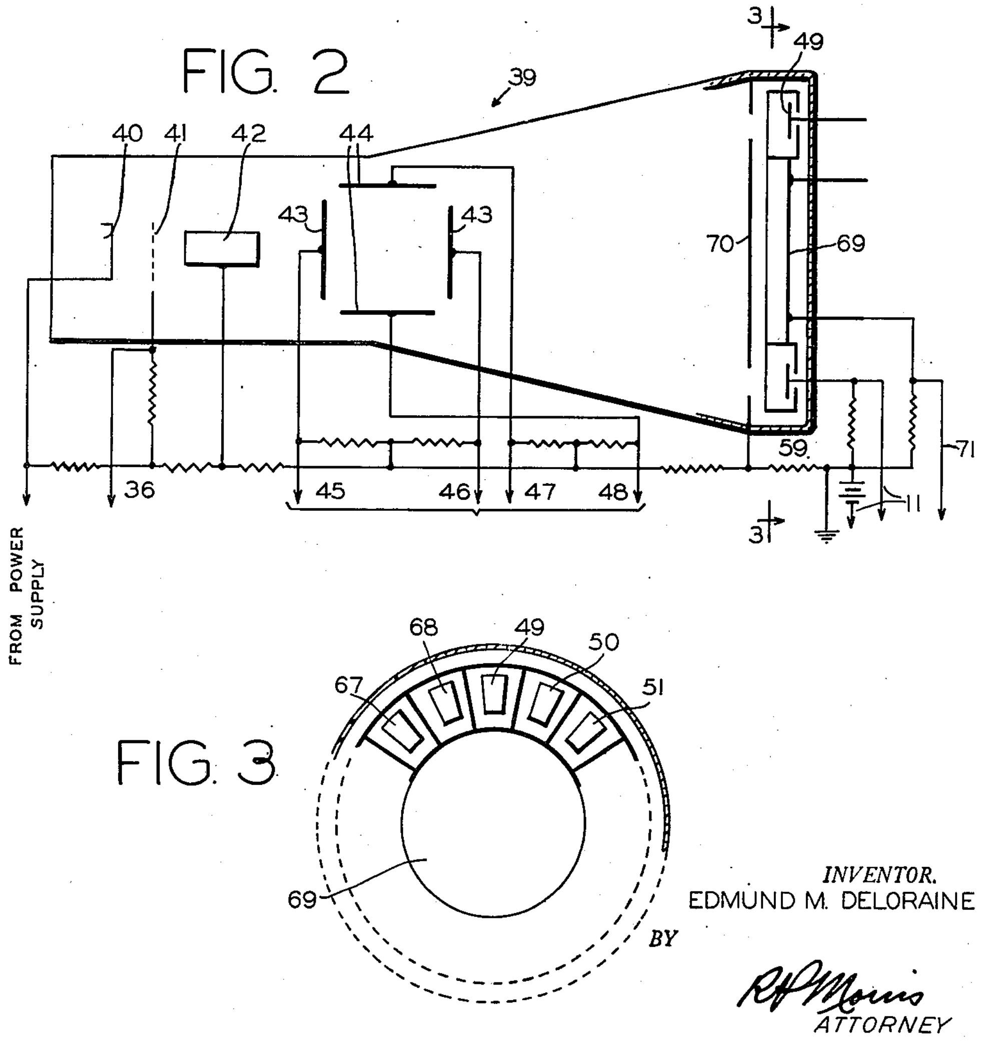
Figs. 2 and 3 are sectional circuit diagrams and views respectively, of a distributor tube used in my system.

The distributor function of common equipment 22 may be performed by a rotating distributor in the form of a cathode ray tube as illustrated in detail in Figs. 2 and 3. The distributor tube is indicated generally at 39 and may comprise a cathode 40, the usual grid 41, focus and anode electrode 42, horizontal deflector plates 43 and vertical deflector plates 44. Two-phase distributor currents from a suitable sweep control may be applied over leads 45, 46, 47 and 48 to the horizontal and vertical deflector plates respectively, so as to produce a cyclic rotation of the electron beam. At the target end of tube 39 are provided twenty coupling targets 49 to 68, respectively, which are coupled with the individual lines 1 to 20 inclusive. These targets may comprise secondary electron emissive elements associated with a common anode 69 to provide dynodes all having a common output. A mask or screen 70 may be provided, if desired, having apertures therein so that the electron beam will impinge on each dynode only when the beam is aligned therewith thus preventing possible secondary emission from others. The output of the distributor tube 39 is connected from anode 69 over lead 71, then signal isolating circuits hereafter described to leads 27 and 28 which go to the line finder circuit as shown in Fig. 1. The output from the line selecting circuit 26 may be applied as indicated over line 36 to the grid 41 serving to modulate the beam in accordance with the selected signal energy. Thus, referring to Fig.

1, the output from lead 71 may be applied after suitable delay (produced in line selecting equipment 26 as hereafter described) over lead 36 to grid 41 to provide the desired communication channel between the chosen pair of lines.

The common equipment 22 is illustrated in Fig. 4. For illustrative purposes a base frequency of 10,000 cycles per second has been selected as the scanning rate of the rotating distributor. This frequency is sufficiently high to reproduce voice frequencies with adequate fidelity for transmission of speech. For the twenty-line system the base frequency is derived from a 200 kilocycle stable oscillator 72 preferably crystal controlled. This higher frequency is preferably utilized since it is generally easier to build a more stable oscillator at the higher frequencies than at the lower 10,000 cycle frequency which is to be used. Furthermore, in certain of the modifications illustrated, the 200 kilocycle wave may be utilized for other control purposes. The sinusoidal frequency generated in master oscillator 72 is reduced to the base frequency of ten kilocycles in frequency divider 73.

The output of frequency divider 73 is applied over 90° phase shifter 74 to the vertical and horizontal sets of deflecting plates 43 and 44 of distributor tube 39 herein diagrammatically illustrated. This will serve to rotate the beam at a frequency of 10,000 revolutions per second so that each of the dynodes 49 to 68, illustrated in Figs. 2 and 3 and in this figure, will be scanned once every 10,000 of a second. Incoming lines 1, 5 and 20 are shown connected to the respective dynodes 49, 53 and 68.

At 21 is illustrated a typical subscriber subset (shown connected to line 5) for use in the system according to my invention. Such a subset will be connected to each of the incoming lines 1 to 20 inclusive. The voice transmitter 75 is connected in series with dial 76 and the normally open switch hook 77. The receiver 78 is bridged permanently across the line, since, for simplicity of illustration, no separate ringing equipment has been illustrated. Accordingly, the signal for summoning a called subscriber may be applied as a special tone which will be reproduced in receiver 78 to call the listener to the phone.

As in the usual equipment, switch hook 77 is normally open. However, upon initiating a call, the switch becomes closed, completing a circuit in the calling line loop over low-pass filter 79 and the associated lines at the sub-set, applying a negative potential from battery 80 to the associated dynode 53. Normally the dynode electrodes 49 to 68 are at the same potential as anode 69 so no current flows. This negative potential will produce a difference in potential and cause secondary emission current to flow from the dynodes upon impingement of the beam of tube 39 thereon, producing a negative output pulse in output line 71. The pulses are preferably signal modulated to a depth of only 25 to 50 per cent so that there will always be sufficient amplitude to furnish energy to establish and maintain connections regardless of modulating signals. The negative pulses resulting from operation of the selected dynode 53 are fed to the grid of inverter tube 81. The anode circuit of tube 81 is coupled to the grid of clipper tube 82 which serves to clip these pulses at a predetermined level to pass only the modulated portions of the incoming pulses. Thus, the output of this tube, representing the speech signals, may be substantially 100 per cent modulated. These clipped pulses are then applied to a cathode follower tube 83 and from there to all of the link circuits over the cathode follower output lead 28. A second output is taken across the cathode resistance of inverter tube 81, these pulses being applied to a clipper tube 84 which serves to clip the pulses to a constant level eliminating modulation effects therefrom. The anode circuit of tube 84 is coupled to the grid of a cathode follower tube 85 which serves to apply pulses 86 through common feed resistor 87 over wire 27 to the grid of line finder gate tube 88 (shown in Fig. 6) of line finder 23 (shown in Figs. 6 and 1) in the first link circuit (now under consideration) and in parallel to the grids of the corresponding line finder gate tubes in all other links. The pulse 86 after passing through resistor 87 may be called 89, so that the pulse actually arriving at the grid of tube 88 and of the other similar tubes is pulse 89. Under the conditions now assumed, when none of the grids of the line finder gate tubes is drawing grid current, pulse 89 is nearly as strong as pulse 86; but under other conditions it may be much weaker than 86 as hereafter explained. In the absence of any signals on the cathode of this line finder gate tube 88, the above traced pulse 89 on its grid is insufficient to cause the flow of plate current, because the bias applied to the grid is sufficiently far below cutoff.

In the line finder 23 (Figs. 1 and 6) is provided an oscillator 90 normally operating at a frequency slightly lower than the output frequency from frequency divider 73 in Fig. 4. This oscillator may, for example, operate at one-fiftieth of one per cent below the frequency of the frequency divider. The output energy from oscillator 90 is applied to a clipper amplifier 91 which serves to produce rectangular selecting pulses 90*a*. These pulses are differentiated in a differentiating network consisting of condenser 92 and resistor 93, to produce the pulse formation 94 which is applied to the control grid of clipper tube 95. The output pulses 96 from tube 95 (corresponding to the leading edge of pulse 90*a* and the positive part of formation 94) are applied to cathode follower tube 97. The resulting pulses 98 are applied to the cathode of tube 88 normally tending to make the cathode of this tube more negative so that the tube will be more nearly conductive. However, except when the pulses 98 applied to the cathode of tube 88 coincide with the previously traced incoming pulses 89, applied via wire 27 to the grid thereof, tube 88 is ineffective. Sufficient bias is applied to the grid of tube 88 from battery 99 so that it requires the combined amplitudes of the two pulses 89 and 98 to operate this tube. As oscillator 90 continues to drift relative to the output of frequency divider 73, the pulses 98 will commence to coincide with the pulses 89 incoming from the calling line, overcoming the bias in tube 88 and producing output pulses 100 in line 32. These output pulses 100 then are applied over condenser 101 to a peaked amplifier and phase corrector circuit 102 which serves to lock oscillator 90 into step with the incoming pulses 89 so that its output is in synchronism with the frequency from divider 73, and pulses 98 will then continue to coincide regularly with the incoming pulses 89 from the predetermined calling line. As soon as the oscillator is locked into step, the pulses from line 32 also are applied over rectifier 103 and an integrating network 104 to a control grid of delayed gain control tube 105. Operation of tube 105 increases the positive voltage on the screen of clipper tube 95 increasing the amplitude of the output pulses 96 and hence 98. The value of resistor 87 and the grid current characteristics of tube 88 are such that the total positive swing of its grid with respect to its cathode cannot exceed a predetermined small amplitude regardless of the magnitudes of pulses 98 and 86 which are applied respectively to the cathode and via resistor 87 to the grid of tube 88. However, the square pulses 98 from tube 97 will increase in amplitude with the change in bias of tube 95. Thus, since the sum of pulses 89 and 98 is roughly constant, while the value of the component 98 is rising, it is clear that the magnitude of pulses 89 must be corespondingly decreasing. This decrease in amplitude of pulse 89 is effective to prevent other line finder gate tubes (similar to 88 but in other links) from responding as more fully explained hereafter in conjunction with Fig. 10.

This decrease in pulse 89 does not, however, reduce the response of tube 88 in the first link (now under consideration) since the total input between grid and cathode is not decreased. Thus, pulses 100 are roughly constant in amplitude. These pulses 100 from the line finder gate tube 88 are applied also over line 32 and coupling circuit 106 to gate control tube 107 which serves to control the suppressor bias on the input gate tube 108. Tube 108 is normally conditioned by suppressor grid bias so that the pulses applied thereto from the output of cathode follower 83 over line 28 will not be passed by the tube. However, upon operation of tube 107, by selection of a predetermined incoming line as described above, the suppressor grid of tube 108 has applied to it such a potential that the tube becomes conductive during the instants corresponding to the time-channel of such predetermined line. Accordingly then, combined dial-and-speech pulses 109 will be applied from the output of tube 108 over line 33 to the pulse forming equipment 24 of Figs. 1 and 5 and to the line selecting equipment 26 of Figs. 1 and 8. However, the energy applied to the line selecting equipment of Fig. 8 will not be passed until such time as line selection has been effected which will be described later.

Line finder 23 having now operated, pulses 109 from line 33 corresponding to the time channel individual to the predetermined line assumed to be calling are applied to an integrating network 110 which may or may not be preceded by a pulse stretching circuit similar to a peak voltmeter. These pulses are then amplified in tube 111 and are applied over transformer 112 to the control grid of the clipper tube 113 and to the control grid of a second tube 114. The integrating network 110 in the input circuit of tube 111 functions as a low-pass filter which will pass the dial pulses but will not pass the higher frequency communication signals. The clipper 113 serves to shape and clip the incoming dial pulses to form square wave pulses 115 which in turn are differentiated in network 116 and applied to the control grid of dial gate tube 117. Tube 117 is biased so as to suppress the negative part of the differentiated pulse (corresponding to the leading edge of the square dial pulse 115) and to pass only the positive part of the differentiated pulse, corresponding to the trailing edge of such square wave pulse 115. Normally tube 117 is nearly cut-off by the voltage drop in its screen grid resistor 118 which is common with the plate of a normally conducting tube 119 of a flip-flop circuit which operates in conjunction with tube 114. Time constants of this circuit are so adjusted that the leading edge of the first dial pulse serves to cause tube 114 to operate, cutting off tube 119. Low-pass filter 120 in the grid circuit of tube 119 causes this condition to be maintained until after the last pulse has passed, when the flip-flop circuit will return to normal, again rendering the dial gate tube 117 insensitive. By provision of this special blocking circuit, transient effects before and after dialing will not affect the register. The output pulses from dial gate tube 117 are applied over line 35 to the dial pulse register circuits 25 of Fig. 1, this pulse passing through resistors 121 and 122 to grids of the first register stage.

The dial pulse register circuits consist of a series of tubes of which 123, 124, 125 and 126 are shown in detail connected as conventional trigger circuits for operation as a binary counter. Blocks 127, 128 and 129 constitute further register trigger circuits not shown in detail, there being a sufficient number of these register circuits to count any dialing number in the exchange. With the system shown for twenty lines the five shown are sufficient. Initially, the tubes on the right hand side such as 124 and 126 are conducting serving to bias tubes 123 and 125 to cut-off. Furthermore, voltages developed in the register circuits are applied as will be described later in more detail over lines 130—139 to bias the various delay gate tubes to cut-off and the zero gate tubes to conduction in the line selecting circuit of Fig. 8.

The negative pulses incoming over line 35 are applied to the first register circuit including tubes 123 and 124. When the register circuit is in its normal condition, that is with tube 124 conducting and tube 123 biased to cut-off, voltage is applied to line 130 maintaining the associated zero device of Fig. 8 in operation and over line 131 blocking a delay gate to be described in more detail later. The first incoming pulse on line 35 passes through resistance 121 to the grid of tube 124 thus causing this tube to cut-off rendering, however, tube 123 operative and applying control voltages to lines 130 and 131 which serve to block the first zero gate and open the first delay gate. The output from tube 124 is applied over a line 140 to the second register circuit comprising tubes 125 and 126 serving to transfer conduction from tube 126 to 125 and from 125 to 126 alternately each time the trigger circuit 123, 124 restores to normal condition (i. e. each time tube 124 becomes conductive). It will thus be clear that the second register shifts its condition for every second pulse applied to the first register while the first register changes its condition for every incoming pulse. The third register 127 is similarly controlled over line 141 so that the register circuit 127 changes its condition each time the second register circuit restores to normal (i. e. each time tube 126 becomes conductive) making register 127 shift its condition once for every two operations of the second register circuit. The fourth register 128 is similarly caused to shift its condition each time the third register 127 restores to normal and the fifth register 129 is similarly controlled from the output of the fourth register 128.

Turning now more specifically to Fig. 8, the operation of these various registers for controlling the delay will be more fully explained. In order to understand the operation of this system it first should be understood that the dials such as 76, Fig. 4, for each line are numbered with digits from 1 to 20 representing the twenty lines. Each dial for any particular line is set so that when a called line is dialed, a number of pulses corresponding to the difference between the calling line and the called line will be transmitted to the exchange. It thus becomes necessary to produce time displacements in the communication energy corresponding to the difference in timing between the scanning of the two lines in the cathode ray scanning circuit 39. The difference signalling pulses operate through the pulse register circuit of Fig. 7 as described above, to select the desired time displacement in accordance with the line which is being called. To this end, each of the register circuits is provided with a zero gate 142, 143, 144, 145 and 146 associated with the first, second, third, fourth and fifth register circuits respectively. Likewise, associated with each of these respective registers are different delay gates 148 (5 microseconds for the twenty line system), 149 (10 microseconds), 150 (20 microseconds), 151 (40 microseconds) and 152 (80 microseconds). Each of these delay gates includes a delay line. In the output of each of these delay lines are delay gate tubes 153 and 154 being illustrated in the case of gates 148 and 149. It is understood that similar delay lines and gate tubes are provided for the other delay gate circuits. In the normal condition, before any pulse arrives, the system is biased so that the zero gates 142 to 146 are all operative so that no delay will be provided in any of the pulses 109 incoming over line 33 from the line finder circuit of Fig. 6. These pulses 109 therefore will be applied directly from line 33 through the zero gate circuits 142 to 146 inclusive, and from there over line 155 to the output gate tube 156. Assuming for the moment that tube 156 is not disabled, its plate delivers corresponding pulses 157 over line 36 to the control electrode of tube 39, Fig. 4, and thence back onto the calling line. The first time the first register operates, the control potential is transferred from line 130 to line 131 rendering tube 153 conductive and biasing tube 142 to cut-off. Thus, if one pulse only is dialed, a delay of five microseconds is produced so that the energy incoming over line 33 will pass through the first delay gate 148 and the remaining zero gates 143 to 146 inclusive. The second pulse transfers the control potential from line 131 back to 130 causing zero gate 142 again to become operative and blocking tube 153 in delay gate 148. At the same time, the second register operates transferring the potential from line 132 to line 133 blocking the second zero gate 143 and opening gate tube 154 in the second delay gate 149 introducing a ten microsecond delay between line 33 and line 155. Thus, the second pulse will produce zero delay in 142 ten microsecond delay in 149 and zero delays in 144 to 146. The third incoming pulse will not affect the second register circuit but will again operate the first register circuit introducing the five microsecond delay gate 148 as well as the ten microsecond delay gate 149 producing a fifteen microsecond delay in the incoming energy. The fourth pulse then will return both the first and second register to normal but will operate the third register 127 producing a twenty microsecond delay at delay gate 150. The fifth pulse will again insert the five microsecond delay gate 148 so that there will be five and twenty microsecond delays producing a total of twenty five microseconds. The next pulse will switch out the five microsecond delay line and switch in the ten microsecond delay line producing a total delay of thirty microseconds. The next pulse will switch in the five microsecond delay line while leaving the ten and twenty microsecond delay ineffective thus producing thirty five microsecond delay. The next successive pulse will then render delay lines 148, 149 and 150 ineffective but will bring into circuit the fourth delay gate 151 with its forty microsecond delay. The other pulses will then bring in, in similar sequence, the five, ten and twenty microsecond delay gates 148, 149 and 150 introducing in sequence five microsecond delays until delay gate 152 is operated whereupon the process will again be repeated in five microsecond steps. Thus, with the five delay gates it is possible to produce any desired delay condition in the twenty lines. It will be clear that if a different number of lines are provided, additional stages for the binary counting system and additional zero gates and delay gates similar to those outlined herein may be provided to secure the proper delay in interconnection for any number of lines.

After the desired number has been dialed, the signalling energy from the calling subscriber will be transmitted as described over the common equipment circuit and line 33 in the link circuit to the grid of tube 156. The output pulse 157 from tube 156 is then transferred over line 36 to the control electrode of tube 39 as illustrated. The voice modulations of pulses 157 incoming over line 36 will then produce variations in the electron stream of tube 39 each time the beam is aligned with the called line electrode and this variation in energy will be passed over the line to the corresponding low-pass filter 79 of the called subscriber to the receiver circuit 78. For the purpose of calling, a tone frequency may be transmitted to operate any suitable tone control apparatus at the called subscriber's line or the output of receiver 78 may be such that attention is directed to the phone directly by whistle or other call transmitted by the calling subscriber.

In the foregoing it has been assumed that tube 156 was conducting, for the purpose of simplicity of explanation. Actually this tube is normally biased to cut-off in order that the dialing pulses incoming over line circuit 23 do not affect other lines during the dialing. This cut-off bias of output gate tube 156 is controlled by the gate control circuit comprising tubes 158 and 159. Tube 158 is normally conducting maintaining the grid of tube 156 biased to cut-off. These tubes 158, 159 in turn are controlled by tube 119 as follows: As explained above tube 119 of Fig. 5 becomes cut-off at the beginning of a series of dial pulses. At such time it sends out an ineffective positive pulse through condenser 160 to the grid of tube 158. As soon as the dialing operation is complete, however, tube 119 returns to conducting condition sending out a negative pulse. This negative pulse cuts off tube 158, which in turn renders tube 159, and also gate tube 156, conductive. This permits the message energy to be transferred over line 36 to the called subscriber's line.

In order to protect the called line from being seized by the line finders of other links when the called subscriber's receiver is removed from the hook, a portion of the delayed pulse 157 is tapped from line 36 over line 37 through isolating resistors 161 in Fig. 4 to a busy pulse shaper 162 from whence it is conducted to the grid of busy gate tube 163. This limits the maximum possible value of the positive line finder pulse 89 from tube 85 which will be applied, after the called subscriber raises his receiver, to a value which is insufficient to operate the line finder gate tube of a searching line finder.

When the call is completed and the calling subscriber hangs up, the register circuits of Fig. 7 and the output gate control 158 and 159 of Fig. 5 must be restored to normal. This is done with tubes 164, 165 and 166 of Fig. 7. When the line finder 23 locks in, tube 105, Fig. 6 is driven to cut-off lowering the potential on the grid of tube 164 over line 31. This causes the flip-flop circuit comprising tubes 164 and 165 to operate transferring the conduction to tube 165. A negative pulse is thus sent over line 167 and condenser 168 to tube 166 which is biased to cut-off and, therefore, has no effect. Now when the line finder releases due to the calling subscriber hanging up, tube 105, Fig. 6, again conducts raising the bias on tube 164 over line 31 causing the flip-flop circuit 164, 165 to return to normal. The return of this circuit to normal sends a positive pulse to tube 166 lowering the potential on common resistance 169, thus restoring all of the register circuits and output gate control tubes 158, 159 to normal. In order to avoid excessive interaction between various register circuits and output gate tubes, resistor 169 should be sufficiently low. Then to insure resetting, tube 164 should carry sufficiently high currents. This tube may comprise several tubes in parallel.

In order to explain the operation of the system, a call will be traced through the circuit from line 1 to line 5. When the calling subscriber on line 1 removes the receiver from the hook in his sub-set (not shown), negative potential is applied to the dynode electrode 49. When the beam of tube 39 next traverses contact 49, secondary emission from this contact will produce a pulse in the common anode 69. This pulse then traverses through inverter circuit 81, clipper amplifier 84, cathode follower 85, resistor 87 and line 27 to the line finder gate tube 88. Line finder gate tube 88 then produces output pulses 100 which serve to lock oscillator 90 into place with the calling line. Thereafter, the pulses 96 derived from this oscillator (and therefore also the reshaped pulses 98) are maintained in coincidence with input pulses 89. Because of this coincidence, only that set of pulses 89 corresponding to the time channel of the calling line now under consideration are passed as pulses 100 by the gate tube 88. All other pulses 89 corresponding to time channels of other calling or called lines are suppressed, thus selecting exclusively the pulses of the line under consideration. These selected pulses 100 then serve to operate gate control tube 107 rendering input gate 108 next conductive, at the correct instants. The output pulses 109 from this tube 108 also represent only the desired ones of all the pulses received from anode 69.

The calling subscriber now dials the number 5 which in this instance produces four successive reductions of the bias on dynode 49. The result is that the particular set of pulses arriving over line 71 as a result of the scanning of this dynode suffer four successive reductions in amplitude. These pulses are applied over line 71, plate circuit of inverter 81, clipper tube 82, cathode follower 83, line 28 to the control grid of input gate 108. Because of the action of clipper tube 82, the four reductions in amplitude of the set of pulses now appear as four complete breaks in this set of pulses. These incoming pulses with their four dialing breaks then are repeated through tube 108 to line 33 as pulses 109. The pulses 109 are transferred over integrating network 110 where the dialing breaks are changed to dialing signals. These dialing signals pass through amplifier 111, transformer 112, clipper 113 (where they become square wave 115). These pass through differentiating network 116, dial gate tube 117 and line 35 to the register circuit. Simultaneously, the dialing signals pass through the further integrating circuit 120 to trigger the delay gate mechanism comprising tubes 114 and 119 into abnormal condition (i. e. with 114 operative and 119 cut-off) and this mechanism increases the positive screen bias of dial gate tube 117 so that it will readily pass the pulses 115 derived from these dialing signals. The successive pulses 115 then control the first three registers so as to bring the third one to abnormal condition but to restore the first two back to normal. This inserts delay gate 150 into circuit producing a twenty microsecond delay equivalent to the time difference in a cycle of the beam sweep of distributor tube 39 between terminal 49 and output terminal 53 associated with line 5. Simultaneously, the increase in plate potential of tube 119 applies a positive pulse through condenser 160 to gate control 158 and 159; but this has no effect, leaving tube 158 conducting, thus maintaining output gate tube 156 blocked during the dialing interval. As soon as the dialing is completed, the positive potential is removed from the grid of tube 114 restoring delay gate mechanisms 114, 119 to its normal condition with tube 119 conducting. This reduces the screen bias of tube 117 preventing further signals from reaching the registers of Fig. 7. Simultaneously the decrease of plate potential of tube 119 sends a negative pulse through condenser 160 to gate control 158, 159, triggering this to its abnormal condition with tube 159 conducting. This unblocks output gate 156. The voice signal pulses 109 arriving over line 33 are applied to the output gate tube 156. This tube then delivers output pulses 157 over line 36 to control grid 35 of tube 39 causing the beam to be modulated in amplitude in accordance with the signals incoming over line 1 each time the beam is in contact with the electrode 53 corresponding to line 5. These pulses varying in amplitude in accordance with the voice signals are then transferred over the corresponding low-pass filter 79 to the receiver 78 of the called subscriber.

When the calling subscriber completes the call and hangs up his receiver, the calling loop circuit is opened and the negative potential removed from electrode 49. When the beam then sweeps past 49 no output pulses will be applied over line 71 and connections to the line finder circuit will be broken. At the same time, the connection to the line finder circuit is broken, the output from the delay gain tube 105 terminates, and the control of lock-in oscillator 90 terminates so that the line finder is again free to pick up any new incoming call. At the same time, the potential from tube 105 is applied over line 31 to the release tube circuit 164, 165. Release tubes 164 and 165 restore to normal with 164 conducting. This produces a positive pulse which is transmitted through condenser 168 to tube 166. This applies a restoring potential to the common resistor 169 restoring all the register circuits to normal so that only the zero delay gates 142 to 159 are again operative. Similarly, gate control 158, 159 is restored to normal with tube 158 conducting. Thus, the whole link circuit is restored to normal.

In order that the pulses from any one incoming line may be effectively reduced in amplitude so as to prevent other line finders from thereafter seizing the same calling line 1, the delayed gain tube 105 and associated circuit are provided. It will be clear from the above description that when two or more subscribers are using the exchange at the same time there will be a plurality of differently timed pulses in the line circuits of the common equipment of Fig. 4. These pulses from the output of cathode follower 83 are applied to all of the link circuits in parallel. When one link circuit, however, has taken hold it is necessary that the pulses of this selected circuit be made ineffective to seize other links. A better understanding of the operation of the system to prevent this operation may be had by reference to Figs. 4 and 6 and the curves illustrated in Fig. 10.

The pulses from the anode 69 of tube 39 are applied to the grid of tube 81 which has separate plate and cathode outputs. The pulses from the plate output of tube 81 varying in amplitude in accordance with an incoming signal are shown in curve 10A. These pulses are clipped in clipper 82 at the level 170 so that only the modulated or varying amplitude portions 171 of the pulses are passed out through the plate circuit of this tube to cathode follower 83. Preferably, the energy is only about 25% modulated so that the modulation variations will constitute the minor portion of the pulsing energy. These pulses are used for transmitting speech and are not of interest in connection with the feature now being considered.

The pulses from the cathode output of tube 81 are the ones of primary interest. These pulses are clipped in tube 84 and passed through cathode follower 85 so as to produce a series of equal amplitude pulses 86 as shown in curve 10B. These pulses 86 are applied through resistors 87 as pulses 89 to the grids of all line finder gate tubes 88 in Fig. 6. Lock-in oscillator 90 produces an output wave 172, curve 10C, whose period is slightly longer than the time interval between two pulses 89. Wave 172 is clipped at clipping levels 173 and 174 then differentiated and again clipped to produce pulses whose leading edges substantially coincide with the instant of rise of wave 172 between the clipping levels. These pulses which are preferably substantially wider than the incoming pulses 89, pass through cathode follower 97 and the resulting pulses 98 are applied to the gate tube 88. Since the frequencies are slightly different, the phase or time position of pulses 89 will continually shift with respect to pulses 98 until pulse 89 coincides with pulse 98 as shown in curve 10D. When this occurs, the line finder gate 88, Fig. 6, is operated so that the pulses may pass through peaked amplifier 102 to the oscillator 90 locking it into step with the pulses. The phase correction of peaked amplifier 102 is so adjusted that sine wave 172 will rise through zero slightly before the time of arrival of pulse 89. The pulses 98 will then be produced in fixed time relationship with pulses 89 as shown in first waveform of curve 10E. Once these pulses are synchronized, the delay gain tube 105 cuts off increasing the screen bias of tube 95 so that the selecting pulses 98 increase from their normal "search" amplitude to a much higher "holding" amplitude as shown in the second waveform in curve 10E, thus reducing the effective height of pulses 89. Thus, pulses 89, applied to the grids of line finder gate tubes (corresponding to tube 88) in all other line finders will be very small as shown in the third waveform of curve 10E. Then even if coincidence between these pulses 89 and the normal or "search" selecting pulse 98 of such other line finders does occur, no signal will be passed through the gate tubes of such other line finders as shown in the fourth waveform of curve 10E.

When the called party answers, the closure of his line loop 5 places on the dynode 53 a potential similar to that of a calling line. If no special precautions were taken this would cause another line finder to seize the called party's line thus tying up an additional link. To avoid this, the busy shaper 162, and busy gate 163 are provided which function as follows:

After the completion of dialing the output gate, tube 156 commences to pass the speech pulses 157 over line 36 to control grid 35 of distributor tube 39 as previously described. Part of the energy of these pulses 157 is branched from line 36 in Fig. 8 and passes over line 37 and isolating resistor 161 to the busy gate shaper 162, which amplifies, clips and reshapes these pulses into strong, sharp constant amplitude pulses. (For this purpose the clipping level of speech clipper tube 82 should be set so that the speech modulation never reduces pulses 171 below a small fixed minimum value.) The reshaped pulses from 162 are applied to the grid of busy gate tube 163 to make this momentarily highly conductive. This gate tube 163 then imposes a fixed upper limit upon the amplitude of the positive pulses 89, so that these cannot attain an amplitude sufficient to cause seizure of the called line by another line finder. Preferably, however, this upper limit is, high enough to hold a line finder which has already locked itself to the called line (in order that the act of selecting a line already engaged as calling line in a previous connection shall not break down such previous connection).

Turning to Fig. 11, I have illustrated a delay line in the system where the longer delays are required. For the shorter intervals shown in delay gates 148, 149 and 150 of five, ten and twenty microseconds, artificial delay lines of known form may readily be used. However, for the longer delays, acoustic delay means may be preferable. The line may, for example, comprise a container 175 filled with mercury 176, having a length $$l-\frac{V}{D}$$

where V is the velocity of sound in the liquid and D is the desired delay time. At the input end is provided a crystal, for example a quartz crystal 177, in a suitable mounting ring 178, with an electrode 179 coupled with line 180 for the input signal.

At the output side is provided a second crystal 181 mounted in a suitable ring 182 with an electrode 183 and coupled to an output line 184. To take care of expansion of the liquid, an off-set portion 185 may be provided with container 175. As previously explained, amplifiers are provided with each delay gate so that the net loss is the same as the associated zero gate.

The foregoing description covers a complete system. However, alternative structures for use in the system may be provided, a few of which are shown in the other figures. Fig. 12, for example, shows an alternative arrangement of line finder and common equipment. According to this arrangement, I have provided the same master oscillator 72, frequency divider 73 and phaser 74 for controlling the sweep of the beam in tube 39. A slightly modified form of coupling circuit for dividing the signal and synchronized pulses is shown differing somewhat from that illustrated in Fig. 4. The output negative pulse from distributor 39 if fed over line 71 to an inverter 186 and then into two cathode followers 187, 188. The tube 188 passes the speech signal to line 28 extending to all the links. This signal has not had its modulation depth increased since this function is performed in the link circuits in this form. The control signal is clipped to constant amplitude in a slightly different manner with a clamping circuit comprising duo diode 189 which limits the amplitude of the signal to the grid of the cathode follower 187. This cathode follower feeds through a series resistance 87 to the grids of all the link circuit tubes 88, as explained before.

These tubes are normally biased sufficiently beyond cut-off so that signals 89 alone on the input electrode will produce no change in the output and as before, coincidence with signals 98 derived from the local oscillator is necessary to produce any response. Instead of providing a local oscillator tuned slightly off the ten kilocycle range, I provide in this system a local oscillator 190 operating at two hundred kilocycles +0−.1%. The output pulses 89 from the tube 187 are applied to the grid of signal gate tube 88 while the output from oscillator 190 is applied through two frequency dividing multivibrators 191 and 192 to provide the desired pulses 96 which operate through tubes 95 and 97 to apply a selecting signal 98 to the cathode of this same tube 88. The relationship between pulses 89 and 98 will progress as previously described until such time as a selecting pulse 98 on the cathode of tube 88 is applied simultaneously with a control pulse 89 to the grid thereof. Thus, tube 88 passes a pulse 100 through to the grid of tube 193 of a delay flip-flop circuit comprising tubes 193 and 194, thus triggering this flip-flop circuit to its abnormal condition with tube 194 conducting, sending to shaper 195 an abrupt voltage rise. This delay flip-flop circuit has a period of action adjusted by the constants of the grid circuit of tube 193. When it spontaneously returns to normal, the voltage to the shaper 195 drops back abruptly thus completing a long positive pulse to the shaper. The pulse shaper serves to differentiate this pulse and suppress the leading portion, the trailing portion of which has a desired delay. This trailing portion is then amplified and applied to oscillator 190 to synchronize it with the master oscillator 72. The halting of the relative drift of these two oscillators stops the pulse progression of pulse 98 with respect to 89 and serves to lock the line finder to the selected line as previously described. Upon locking into step, the pulses 100 from tube 88 are rectified in rectifier 103 serving to cut-off tube 105 increasing the gain of tube 95 and hence the amplitude of the pulses 96 and then 98 which are applied to the cathode of tube 88. Because of the fact that a higher frequency is used for the local oscillator, a more stable operation and precise lock-in can be obtained.

The busy gate tubes 196 and 197 operate as before to impose upon the pulses 89 an upper limit somewhat lower than the limit imposed by clamper 189. This new limit being high enough to hold a previously engaged line finder but low enough to prevent engaging a new one. In performing this function, tubes 196 and 197 act in a manner similar to duo diode clamper such as 189. At the instant of arrival of a positive pulse from busy pulse shaper 162 upon the grid of tube 196 it becomes highly conductive and thus acts as a diode to prevent wire 27 from rising above the potential of its cathode. Tube 197 acts as a reverse clamper to discharge the negative potential which would remain at the end of such pulses.

A still different line finder circuit is illustrated in Fig. 13 which may be substituted for Fig. 6 (again in the grouping shown in Fig. 9). The line finder oscillator arrangement is substantially similar to that shown in Fig. 12. However, the lock-in oscillator 198 incidentally performs a frequency division and, moreover, is controlled through the medium of master oscillator 72 instead of being controlled solely by the selected line pulses. The lock-in oscillator 198 operates at a frequency slightly less than the two hundred kilocycles, its 50 kc. output being fed through a clipper differentiator circuit 199 to the ten kilocycle synchronized multivibrator 200. The output of this multivibrator 200 is applied through the differentiating nets 92 and 93 to tube 95 which serves to form and amplify the pulses. Tube 95 is normally biased beyond cut-off but the leading edge of each square wave output from multivibrator 200 is of sufficient strength to first drive the grid positive on a portion of the square wave. A negative pulse 96 of approximately five microseconds is produced in the plate circuit. A cathode follower tube 97 passes the signal or control pulse 98 to the cathode of line finder tube 88. When the signal 89 on the grid of tube 88 coincides with the above-described selecting pulse 98, the tube 88 conducts and passes a pulse 100 to three places, namely to diodes 103 and 201 and over wire 32 to the line selecting circuit (if this is of the type shown in Fig. 16).

This pulse 100 is rectified in tube 201 and fed to an integrating network 202. The negative potential from the integrator is amplified in tube 203 reducing the potential in cathode resistor 204 which is common to tube 203 and tube 205. The reduction of this potential renders tube 205 conductive. Thus, this tube 205 now commences to pass the sine wave from master oscillator 72, which is continuously applied to the grid thereof over line 29. This amplified wave is then passed through phase corrector circuit 206 serving to lock-in oscillator 198 with the master oscillator 72. Accordingly, progression of selection is now stopped so that the pulses 89 will pass through tube 88 to open line finder gate tube 108 at the correct instants, thus causing the latter to pass the desired signal pulses from wire 28 to wire 33 in the manner previously described in connection with Figs. 4 to 9 inclusive.

Simultaneously, the application of pulses 100 to diode 103 actuates tubes 105 and 95 to prevent engagement of other line finders as previously described.

In the system previously described, the dial register circuit and the line selecting equipment of Figs. 7 and 8 are provided with the binary counting system together with delay lines to achieve the desired time displacement of the incoming pulse signals. An alternative combination of a pulse register circuit and associated line selection circuit is shown in Figs. 15 and 16 respectively, which may be substituted as a unit for Figs. 7 and 8. Also an alternative pulse forming circuit is illustrated in Fig. 14 which may be substituted for the circuit of Fig. 5. If these circuits of Figs. 14, 15 and 16 are used in place of Figs. 5, 7 and 8, and if the line finder of Fig. 13 and the common equipment of Fig. 4 are used as last assumed, the whole system will correspond to the group of circuits illustrated in Fig. 17.

Turning first to Fig. 14, the incoming pulses 109 with their dialing breaks are passed through tube 111, transformer 112, tube 113 and tube 114 in a manner previously described to an output line 35.

Dial gate tube 206 which nearly corresponds to tube 117 in Fig. 5 is normally biased to conduction by the voltage on its suppressor from the dial gate control 158, 159 (with tube 158 normally conducting). As previously described, tube 119 cuts off at the beginning of a series of dial pulses (sending out an ineffective positive pulse) and reoperates at the end, sending out a negative pulse through diode 207 to the dial gate control 158, 159. This negative pulse from tube 119 cuts off tube 158 causing tube 159 to conduct. This biases tube 206 to cut-off locking out the dial gate so that transients and voice modulations or even additional dialing will not disturb the registers. At the same time, a control voltage is sent out over lead 38 biasing the control grid of the output gate 156 for conduction.

Turning now to Figs. 15 and 16, the output line 35 is coupled to a plurality of trigger circuits 208, 209, 210 and 211. As many of these trigger circuits are provided as there are subscriber's lines. Normally, the right-hand tubes of each pair (except for the preliminary one 208) are cut-off, biasing the respective gate tubes 212, 213 and 214 to cut-off on their associated suppressor grids. When a series of dial pulses has been received, it is intended that one of the right hand tubes will be left conducting, permitting its gate tube to pass the signal.

The operation of the register may be described as follows: The first trigger circuit 208 has no associated gate and tube 215 is normally conducting. A first pulse over wire 35 from the pulse forming circuit (Figs. 14 or 6) cuts off tube 215 of trigger circuit 208 causing tube 216 to conduct. When tube 216 conducts, a negative pulse is sent from its plate circuit to the grid of the normally conducting tube 217 of trigger circuit 209 cutting off this tube and causing tube 218 to conduct. This operation of tube 218 serves to open the first gate tube 212. The second negative pulse from the pulse forming circuit cuts off tube 218 transferring conduction to tube 217. A negative pulse from the plate of tube 217 cuts off tube 219 restoring gate 1 to blocked condition which transfers conduction to tube 220 in the next register 210. The cut-off of tube 218 restores the first gate tube 212 to blocked condition while the conduction of tube 220 unblocks the second gate tube 210. This cycle is repeated in succeeding registers until the last dial pulse has been sent.

Thus, at the end of dialing only the gate corresponding to the number of dial pulses is left unblocked. If it is still assumed that line 1 is calling line 5, the fourth gate will be unblocked. Assuming for convenience that line 3 is calling line 5, the second gate 213 will be unblocked. As a consequence then, any pulses which may arrive on the grids of the gate tubes (e. g. over lines 221, 222, etc.) will be passed only by gate 213 to the common output wire 223 as will be described in more detail in connection with Fig. 16.

After the calling subscriber has hung up, the release circuit for restoring the registers 208—211 to normal will be operated in a manner similar to that described in connection with Fig. 7. This circuit is controlled so that tube 165 is normally cut-off. When the line finder 23 finds a line and locks-in, a signal is applied over line 31 so that the tube 165 conducts. The resulting negative pulse from tube 165 is passed on to tube 166 over condenser 168 but is not effective since tube 166 is already cut off. However, when the line finder releases, tube 165 is returned to its normal cut-off condition, passing a positive pulse to tube 166. This is amplified as a negative pulse in the plate circuit of tube 166 serving to reset all of the register trigger circuits 208—211 to normal as well as gate control 158, 159.

The manner in which the speech signals are delivered to the selected called (e. g. line 5) will now be considered in detail in connection with Figs. 15 and 16. In this embodiment instead of producing a true transmission delay in the speech signals from the calling line these are stored and then later released. To determine the proper instant for releasing these stored signals, the equipment counts the pulses which mark the time channels intervening between the calling and called line channels.

In order that this counting may start at the instant corresponding to the calling line's time channel, a synchronizing pulse from the line finder gate tube over line 32 is passed through the shaping amplifier 224 to the synchronizing counter 225. Thereafter, pulses 226 produced in shaping amplifier 227 under control of oscillator 72 carry forward the operation of the system through counters such as 228, 229 and 230 in a manner similar to that described for the register circuits 208—211. Only three counters are shown corresponding to the three described gates 212, 213 and 214, and these counters and gates cooperate to control the instant of release of speech energy to the called line. As the counters operate successively, they apply potentials to wires 221, 222, etc. But if only gate 213 is open, only the potential on wire 222 will pass to common wire 223, thus properly timing the release of speech signals to the called line as will shortly appear.

The incoming energy from the line finder gate tube 108 is applied by means of line 33 to a low-pass filter and audio amplifier 231 which serves as a storage means for the incoming speech signals. These speech signals from the output of filter 231 are continuously applied to the control grid of gate tube 232 (which substantially corresponds to tube 156, Fig. 8). However, no energy can pass until the completion of dialing when the cut-off bias is removed from control grid of gate tube 232 by the gate control 158, 159 and further until such time as the proper gate pulses are applied from wire 223 to cut-off gate control tube 233 which in turn removes the bias on the suppressor grid of this tube 232. The latter bias will be removed at the proper time relation depending upon which one of the gate tubes 212—214 is open at that time. The gate tube 232 will, therefore, be opened at the proper instant in accordance with the incoming line signal so that the energy from storage filter 231 will be passed only at the proper time for application to the outgoing line over lead 36, Pulse shaping amplifier 224 is shown connected over line 32 to receive the pulses 100 (which correspond to the calling line's time channel) directly from the line finder circuit. In this arrangement, the counting, therefore, will be proportional to the difference between the calling and called line and each dial should be arranged to dial such difference.

In many cases, however, it may be desirable to start the counting from a fixed zero point as derived from the synchronizing distributor itself. For this purpose, therefore, the pulse shaping amplifier 224 may be disconnected from line 36 and instead may be connected to frequency divider 73. Thus, the synchronization instead of starting from the line finder pulse (which represents different time channels for every different calling line) will start from a zero corresponding always to time channel of line 20 on the distributor, the count then being in accordance with the line number called regardless of the time position of the calling line. Preferably line 20 may be omitted in such case. This simplifies the sub-station equipment since the dials may all be the same at all stations. Furthermore, since it is not necessary to measure the time difference between the calling and called stations, multiple turns of the dial may very simple be used for signalling in accordance with this last-described system, merely by suitably modifying the pulse forming circuit (of Figs. 5 or 14) to pass plural dialing trains, and by adding further register gates and counters.

In the foregoing, I have started by describing the first embodiment of my invention comprising Figs. 4, 5, 6, 7 and 8, grouped as shown in Fig. 1, and have next assumed that Fig. 12 was substituted for Figs. 4 and 6. Finally, I have assumed that Figs. 4 and 13 were put in place of Fig. 12, also that Fig. 14 was put in place of Fig. 5, and also that Figs. 15 and 16 were put in place of Figs. 7 and 8. Thus, the last combination assumed corresponded to the grouping shown in Fig. 17. It should be understood that the circuit diagram of Figs. 5 and 14 may be interchanged in any of the combinations and similarly that Figs. 6 and 13 are interchangeable. Also, the combination of Figs. 7 and 8 is interchangeable with the combination of Figs. 15 and 16.

With respect to Fig. 12, not only may this figure be interchanged with the combination of Figs. 4 and 6, or with the combination of Figs. 4 and 13, but also the upper portion of Fig. 12 (representing a common equipment) may be separately interchanged with Fig. 4 and the lower portion of Fig. 12 (representing a line finder circuit) may be separately interchanged with Fig. 6 or with Fig. 13. In the case of such separate interchanges involving a portion of Fig. 12, the function performed by tube 108 in the line finder will be slightly different from what was described. This is because the common equipment of Fig. 4 performs a clipping which has consequently not been described as being performed by tube 108 of Figs. 6 and 13, while in the case of Fig. 12, the common equipment omits this function and, therefore, tube 108 of this figure was described as clipping the signal. Thus, when combining Fig. 6, for instance, with the upper part of Fig. 12, it must be assumed that tube 108 of Fig. 6 acts as a clipper. This does not, however, require any change in the circuitry, but only a change in constants which are assumed in all cases to be permissible wherever required.

In the foregoing forms of my invention, it has been assumed that the called subscriber would operate the switch hook in the conventional manner upon answering. This is not necessary with the proper arrangement of sub-station equipment so that the provision of tubes 166 and 196 in Figs. 4 and 12 respectively, for protection against a line finder picking the called line is not required and it may be removed from its socket.

Further with tubes 166 or 196 omitted, it is possible to set up two-way talking as follows:

A call is set up in the manner described for either Figs. 9 or 17 and the called party is signalled followed by the calling party's line number. The called party operates his switch-hook and dials the calling party's number. This call proceeds exactly as the previous call over a new link circuit so that a path is established in each direction between the calling and called parties. In order that singing shall not ensue, the total gain in each link is adjusted to be less than unity.

Two-way talking may be set up in a single link if the line selecting circuit of Figs. 15 and 16 is used and if minor circuit additions are made in line finders circuit of Figs. 6, 12 and 13 and the line selecting circuit of Figs. 15 and 16, as follows:

Connect line 32 through a condenser and resistance to the grid of the output gate control tube 233, Fig. 16. Similarly, connect line 37 through a condenser and resistance to the grid of the input gate control tube 107 in Figs. 6, 12 and 13. It is understood that the values of the added resistors and condensers together with the illustrated resistors and condensers 196 assure that the signals on lines 32 and 37 shall not interact. As a result of this change, speech signals may pass in either direction after the call has been set up. Input gate tube 108 will now pass signals on its grid at a time corresponding to the time channels of both the calling and the called lines which are passed on to the low-pass filter and amplifier 231 to the grid of the output gate 232. This gate in turn will pass signals at a time corresponding to the time channels of both the calling and called lines to the grid of the distributor tube 39 and to the respective subscriber as previously described. The gain control is adjusted so as to set the gain through the system at less than unity to prevent singing.

For the sake of simplicity, the counters 225, 228—230 have been shown as comprising triodes, but will actually preferably employ tetrodes or pentodes (with the screens and suppressors conventionally biased) to improve the speed of counting, and known expedients for further increasing the speed may be used in these or other circuits. If desired, the speed requirements may be lessened by reducing the number of lines in distributor 39. Also, it should be understood that the several batteries and sources of positive and negative potential shown may be derived from one or a few power supplies, although the various potentials shown by a given symbol are not necessarily equal.

While I have described specifically a particular embodiment of my invention and certain modifications thereof, it is to be clearly understood that this is given merely by way of illustration. Numerous changes in the circuit arrangements and in detail circuits will readily occur to those skilled in the art. Specific description, therefore, is considered merely as illustrative of my invention and not as a limitation on the scope of my invention as set forth in the objects thereof and in the accompanying claims.

What is claimed is:

1. An exchange system comprising a plurality of channels in excess of two, means for permanently assigning to all said channels predetermined different time positions in a time position cycle, means for producing a time displacement of energy on any one of said channels equal to the time displacement between that channel and any selected other of said channels, and means for applying said time-displaced energy to said other of said channels.

2. A system, according to claim 1, in which the means is responsive to selective signals from any one of the channels for producing the desired time displacement.

3. A system, according to claim 2, in which there are a plurality of the means for producing the energy time displacement and each one includes means responsive to the initiation of signals on any channel for establishing and maintaining a communication connection with said channel.

4. A system, according to claim 3, in which each of the means for producing a time displacement is provided with means controlled by the means responsive to the initiation of signals on a channel for making the responsive means nonresponsive to the initiation of signals on other channels.

5. A connecting system for interconnecting any two lines of a plurality of lines for transfer of signal energy, comprising terminal means for each of said lines, distributor means scanning all said terminal means in succession whereby each line has a predetermined time position in the scanning cycle, signal responsive means for producing an effective time displacement in the signal energy of one of said two lines equal to the difference in time positions in the scanning cycle of said two lines, and means for applying said displaced signal energy to said distributor means, whereby signal energy will be transferred between said two lines.

6. An exchange method for interconnecting any two lines of a plurality of lines for transfer of energy by means of a scanning distributor means, comprising successively scanning said lines by said distributor means, assigning predetermined time positions of said scanning cycle to each of said lines, whereby there is established a parallel common channel of all said lines, producing an effective relative time delay of the energy of a selected line equal to the time difference between said selected lines and any other line to be interconnected therewith, and applying said displaced energy to said distributor means for transfer to the line then being scanned.

7. An exchange system for interconnecting any two lines of a plurality of lines for transfer of signal energy of a predetermined frequency, comprising terminal means for each of said lines, distributor means scanning all said terminal means in succession at a rate higher than the frequencies of said signals, whereby each line has a predetermined time position in the scanning cycle, signal responsive means for producing an effective delay in the signal energy of one of said two lines equal to the difference in time positions in the scanning cycle of said two lines to be interconnected, and means for applying said delayed signal energy to said distributor means.

8. An exchange system for interconnecting a plurality of pairs of lines of a plurality of lines for transfer of audio frequency energy, comprising terminal means for each of said lines, distributor means scanning all said terminal means in succession at a rate higher than the frequencies of said energy, whereby each line has a predetermined time position in the scanning cycle, means for conditioning certain of said lines for communication connection to transfer signals indicative of the line connections desired, means responsive to said signals for producing an effective time displacement in the energy of each said certain lines corresponding to the time positions in the scanning cycle of said desired connections, and means for applying said displaced energy from each of said certain lines to said distributor means.

9. An exchange system comprising a plurality of subscriber lines, terminal means for each of said lines, means for scanning said terminals in succession, a plurality of line finder circuits, means responsive to a predetermined voltage on one of said terminals corresponding to a calling line for transferring a control voltage to a given one of said line finders to lock out other lines therefrom, selective signal register means coupled to each line finder circuit for registering the number of a selected called line, a line selector circuit coupled to each line finder circuit and each register means, means in said line selector circuits responsive to said registered number for producing an effective time displacement of the communication signals in the associated calling line equal to the inherent time difference in the scanning cycle of the calling and called lines, and means for coupling said line selector circuit to said scanning means to provide communication interconnection of said calling and called lines.

10. An exchange system comprising a plurality of subscriber lines, signal and communication means coupled to each of said lines, terminal means for each of said lines, electron beam scanning means for scanning said terminals in succession at a rate higher than the communication frequency, a plurality of line finder circuits, means responsive to a conditioning of a selected one of said terminals corresponding to a calling line for transferring control voltage in response to said electron beam to a given one of said line finders to lock out other lines therefrom, selective signal register means coupled to each line finder circuit for registering the number of a selected called line in response to selective signals, a line selector circuit coupled to each line finder circuit and each register means, means in said line selector circuits responsive to said registered number for producing an effective time displacement of the communication signals in the associated calling line equal to the inherent time difference in the scanning cycle of the calling and called lines, and means for coupling said line selector circuits to said electron beam scanning means to provide communication interconnection of said calling and called lines.

11. An exchange system comprising a plurality of subscriber lines, signal and communication means coupled to each line, terminal means for each of said lines, electron beam scanning means for scanning said terminals in succession at a rate higher than the communication frequency, a plurality of line finder circuits, means responsive to a predetermined voltage on a selected one of said terminals corresponding to a calling line for transferring control voltages under control of said electron beam to a given one of said line finders to lock out other lines therefrom, selective signal register means coupled to each line finder circuit for registering the number of a selected called line in response to selective signals, a line selector circuit coupled to each line finder circuit and each register means, means in said line selector circuits responsive to said registered number for producing an effective time displacement of the communication signals in the associated calling line equal to the inherent time difference in the scanning cycle of the calling and called lines, and means for coupling said line selector circuits to control the beam of said electron beam scanning means to provide communication interconnection of said calling and called lines.

12. An exchange system comprising a plurality of subscriber lines, signal and communication means coupled to each line, terminal means for each of said lines, electron beam scanning means for scanning said terminals in succession at a rate higher than the communication frequency, a plurality of line finder circuits, means responsive to a predetermined voltage on a selected one of said terminals corresponding to a calling line for transferring control voltages in response to said beam to a selected one of said line finders, means responsive to said voltages for effectively rendering a selected line finder non-responsive to other of said lines, selective signal register means coupled to each line finder circuit for registering the number of a selected called line in response to selective signals, a line selector circuit coupled to each line finder circuit and each register means, means in said line selector circuits responsive to said registered number for producing an effective time displacement of the communication signals in the associated calling line equal to the inherent time difference in the scanning cycle of the calling and called lines, and means for coupling said line selector circuits to said electron beam scanning means to provide communication interconnection of said calling and called lines.

13. An exchange system comprising a plurality of subscriber lines, terminal means for each of said lines, scanning means for scanning said terminals in succession, a plurality of link circuits each comprising line finder means for coupling to a calling line, selective signal register means coupled to said line finder means for registering the number of a selected called line in response to line designating signals, a line selector circuit coupled to said line finder circuit and said register means, means in said line selector circuits responsive to said registered number for producing an effective time displacement of communication signals in an associated calling line equal to the inherent time difference in the scanning cycle of the calling and called lines, means under control of said scanning means for coupling a calling line to a line finder of a link circuit, and means for coupling the associated line selector circuit to said scanning means to provide communication interconnection of said calling and called lines.

14. A telephone exchange system in which a plurality of subscribers' sets each provided with connection control means, signalling means and communication transmitting and receiving means are each coupled by a line to the exchange system; comprising terminal connections for each of said lines, cathode ray tube means having responsive means coupled to each of said terminals, a beam producing means, beam deflection means and beam control means, means for producing a deflection potential coupled to said deflection means to scan said beam cyclically over said responsive means in succession, means responsive to calling operation of each of said connection control means for conditioning the associated responsive means for response to said beam, line finder means responsive to response of said responsive means for establishing energy transfer coupling to one of said lines, a signal register means coupled to each said line finder means for receiving and registering energy from the signalling means indicative of the called subscriber's line, a variable time displacement means coupled to said line finder means, means for adjusting said time displacement means under control of said signal register means to provide an effective time displacement substantially equal to the tiime difference between the calling line and said called line as indicated by the respective positions in the deflection cycle of said beam, and means for coupling said time displacement means to said beam control means whereby communication connection is established between said each calling and called subscriber's line.

15. A system according to claim 14, wherein said time displacement means comprises a plurality of pulse delay means of different periods, and means responsive to the signals in said signal register means for selecting a predetermined one of said delay means.

16. A telephone exchange system in which a plurality of subscribers' sets each provided with connection control means, signalling means and communication transmitting and receiving means are each coupled by a line to the exchange system; comprising terminal connections for each of said lines, cathode ray tube means having responsive means coupled to each of said terminals, a beam producing means, beam deflection means and beam control means, means for producing a deflection potential coupled to said deflection means to scan said beam cyclically over said responsive means in succession at a rate relatively high with respect to the frequencies of said signals and said communications, means responsive to calling operation of each of said connection control means for conditioning the associated responsive means for response to said beam, line finder means responsive to response of said discharge means for establishing energy transfer coupling to one of said lines and for effectively blocking said selected line finder from coupling to other of said lines, a signal register means coupled to each said line finder means for receiving and registering energy from the signalling means indicative of the called subscriber's line, a variable time displacement means coupled to said line finder means, means for adjusting said time displacement means under control of said signal register means to provide an effective time displacement substantially equal to the time difference between the calling line and said called line as indicated by the respective positions in the deflection cycle of said beam, and means for coupling said time displacement means to said beam control means whereby communication connection is established between said each calling and called subscriber's line.

17. A telephone exchange system in which a plurality of subscribers' sets each provided with control switches, signalling means and communication transmitting and receiving means are each coupled by a line to the exchange system;

comprising terminal connections for each of said lines, cathode ray tube means having discharge means coupled to each of said terminals, a beam producing means, beam deflection control means and beam intensity control means, means for producing a deflection potential coupled to said deflection control means to scan said beam cyclically over said discharge means at a rate relatively high with respect to the frequencies of said signals and said communications, means responsive to calling operation of each of said control switches for conditioning the associated discharge device for response to said beam, a plurality of link circuits, line finder means in each said link circuit responsive to response of said discharge means for establishing energy transfer coupling to one of said lines and for effectively blocking said selected line finder from coupling to other of said lines, a signal register means coupled to each said line finder means for receiving and registering energy from the signalling means indicative of the called subscriber's line, a variable time displacement means coupled to said line finder means, means for adjusting said time displacement means under control of said signal register means to provide an effective time displacement substantially equal to the time difference between the calling line and said called line as indicated by the respective positions in the deflection cycle of said beam, and means for coupling said time displacement means to said beam intensity control means whereby communication connection is established between said each calling and called subscriber's line.

18. A telephone exchange system in which a plurality of subscribers' sets each provided with control switches, dial pulse generators and communication transmitting and receiving means are each coupled by a line to the exchange system; comprising terminal connections for each of said lines, cathode ray tube means having discharge means coupled to each of said terminals, a beam producing means, beam deflection control means and beam intensity control means, means for producing a deflection potential coupled to said deflection control means to scan said beam successively over said discharge means in succession at a rate relatively high with respect to the frequencies of said signals and said communications, means responsive to calling operation of each of said control switches for conditioning the associated discharge device for response to said beam, a plurality of link circuits, a line finder in each said link circuit responsive to said discharge means for establishing energy transfer coupling to one of said lines, means effective upon establishing said coupling for effectively altering the sensitivity of said line finder to render said selected line finder ineffective for coupling to other of said lines, a dial pulse register coupled to each said line finder means for receiving and registering energy from the dial pulse generators, indicative of the called subscriber's line, a variable time displacement means coupled to said line finder, means for adjusting said time displacement means under control of said dial pulse register to provide an effective time displacement substantially equal to the time difference between the calling line and said called line as indicated by the respective positions in the deflection cycle of said beam, and means for coupling said time displacement means to said beam intensity control means whereby communication connection is established between said each calling and called subscriber's line.

19. A telephone exchange system having a plurality of subscriber's sets each provided with control switches, signalling means and communication transmitting and receiving means are each coupled by a line to the exchange system, terminal connections for each of said lines, and means for cyclically scanning said terminals, an exchange system comprising link circuit means, means responsive to calling operation of each of said control switches for conditioning the associated terminal connection for response to said scanning of the terminal for establishing energy transfer coupling between one of said lines and one of said link circuit means, a signal register means in each said link circuit for receiving and registering energy from the signalling means indicative of the called subscriber's line, a variable time displacement means in said link circuit, means for adjusting the time displacement of said time displacement means under control of said signal register means to provide an effective time displacement substantially equal to the time difference between the calling line and said called line as indicated by the respective scanning positions of said lines, and means for coupling said time displacement means to said scanning means whereby communication connection is established between said each calling and called subscriber's line.

20. A system for intercoupling any two circuits of a plurality of circuits, comprising a cathode ray tube, having a beam and beam modifying control electrodes, means for coupling said circuits to spaced target electrodes of said cathode ray tube, means for scanning the beam cyclically over said target electrodes, means effective upon selection of one of said circuits for deriving energy from the associated target electrode while said beam scans thereover, means for providing a time displacement of the derived energy equivalent to the relative cyclic time position of the target electrode associated with the circuit to be interconnected with the selected circuit, and means for applying said delayed energy to said beam modifying control electrodes, to produce modification in said beam in accordance with said energy at the times said beam traverses the second-named target electrode.

21. A system according to claim 20, wherein said target electrodes each comprise secondary emission dynodes.

22. A system according to claim 20, wherein said beam modifying control electrode comprises a beam intensity control means.

23. A telephone exchange system in which a plurality of subscribers' sets each provided with control switches, signalling means and communication transmitting and receiving means are each coupled by a line to the exchange system comprising terminal connections for each of said lines, cathode ray tube means having discharge means coupled to each of said terminals, a beam producing means, beam deflection control means and beam intensity control means, means for producing a deflection potential coupled to said deflection control means to scan said beam over said discharge means in succession at a rate relatively high with respect to the frequencies of said signals and said communications, means responsive to calling operation of each of said control switches and positioning of said beam over said discharge means for establishing energy transfer coupling to one of said lines, a variable time displacement means, means for adjusting the time displacement of said time displacement means under control of signals from said signalling means to provide an effective time displacement substantially equal to the time difference between the calling line and said called line as indicated by the respective positions in the deflection cycle of said beam, and means for coupling said time displacement means to said beam intensity control means whereby communication connection is established between said each calling and called subscriber's line.

24. A telephone exchange system comprising an electronic means for cyclically scanning a plurality of lines, whereby each line has a predetermined time position in said cycle, means responsive to incoming calling signals for producing a time displacement in the communication signals of a calling line equal to the time difference in said scanning cycle of said calling line and a called line comprising delay lines related to the time periods of said lines, means for selecting a combination of said delay lines to provide the desired delay, and means coupling the calling line to the input of said selected combination of delay means.

25. A telephone exchange system comprising an electronic means for cyclically scanning a plurality of lines, whereby each line has a predetermined time position in said cycle, means responsive to incoming calling signals for producing a time displacement in the communication signals of a calling line equal to the time difference in said scanning cycle of said calling line and a called line comprising delay lines arranged in sectional relation and related in time delay to the time periods of said lines, means for selecting a combination of said sections to provide the desired delay, and means for coupling the calling line to the input of said selected combination of sections.

26. A telephone exchange system comprising an electronic means for cyclically scanning a plurality of lines, whereby each line has a predetermined time position in said cycle, means responsive to incoming calling signals for producing a time displacement in the communication signals of a calling line equal to the time difference in said scanning cycle of said calling line and a called line comprising delay lines related in binary fashion to the time periods of said lines, means for selecting a combination of said delay lines to provide the desired delay, and means coupling the calling line to the input of said selected combination of delay means.

27. An exchange system comprising a plurality of subscriber lines, terminal means for each of said lines, means for scanning said terminals in succession, a plurality of line finder circuits, means responsive to a calling condition of one of said lines for causing one of said line finders to establish a signal transfer connection with the calling line, means responsive to establishment of said connection for blocking the others of said line finders from establishing connection with said calling line, selective signal register means coupled to each line finder circuit for registering the number of a selected called line, a line selector circuit coupled to each line finder circuit and each register means, means in said line selector circuits responsive to said registered number for producing an effective time displacement of the communication signals in the associated calling line equal to the inherent time difference in the scanning cycle of the calling and called lines, and means for coupling said line selector circuit to said scanning means to provide communication interconnection of said calling and called lines.

28. A telephone exchange system in which a plurality of subscribers' sets each provided with control switches, signalling means and communication transmitting and receiving means are each coupled by a line to the exchange system, terminal connections for each of said lines, and means for cyclically scanning said terminals; an exchange system comprising means responsive to calling operation of each of said control switches for conditioning the associated discharge device for response to said beam, a plurality of link circuits, line finder means in each said link circuit responsive to response of said discharge means for establishing energy transfer coupling to one of said lines and for effectively blocking others of said line finders from coupling to said calling line, a signal register means coupled to each said line finder means for receiving and registering energy from the signalling means indicative of the called subscriber's line, a variable time displacement means coupled to said line finder means, means for adjusting said time displacement means under control of said signal register means to provide an effective time displacement substantially equal to the time difference between the calling line and said called line as indicated by the respective positions in the deflection cycle of said beam, and means for coupling said time displacement means to said beam intensity control means whereby communication connection is established between said each calling and called subscriber's line.

29. A telephone exchange system in which a plurality of subscribers' sets each provided with control switches, signalling means and communication transmitting and receiving means are each coupled by a line to the exchange system; comprising terminal connections for each of said lines, cathode ray tube means having discharge means coupled to each of said terminals, a beam producing means, beam deflection control means and beam intensity control means, means for producing a deflection potential coupled to said deflection control means to scan said beam cyclically over said discharge means at a rate relatively high with respect to the frequencies of said signals and said communications, means responsive to calling operation of each of said control switches for conditioning the associated discharge device for response to said beam, a plurality of link circuits, line finder means in each said link circuit responsive to response of said discharge means for establishing energy transfer coupling to one of said lines and for effectively blocking others of said line finders from coupling to said calling line, a signal register means coupled to each said line finder means for receiving and registering energy from the signalling means indicative of the called subscriber's line, a variable time displacement means coupled to said line finder means, means for adjusting said time displacement means under control of said signal register means to provide an effective time displacement substantially equal to the time difference between the calling line and said called line as indicated by the respective positions in the deflection cycle of said beam, and means for coupling said time displacement means to said beam intensity control means whereby communication connection is established between said each calling and called subscriber's line.

30. An exchange system for a plurality of channels, comprising electronic means for continuously and cyclically scanning said channels, and means responsive to the initiation of a call on a channel for establishing and maintaining over said electronic means a communcation connection with a called channel while continuing the cyclic scanning.

31. The exchange system according to claim 30, and in which the means responsive comprises a normally ineffective multi-electrode discharge tube, and a circuit for rendering said tube effective only when the calling channel is scanned.

32. The exchange system according to claim 30, and in which the means responsive comprises a normally ineffective multi-electrode discharge tube, and a circuit for rendering said tube effective only when the called channel is scanned.

33. An exchange system according to claim 30, and a second means responsive to the initiation of a call on a second channel for establishing and maintaining over said electronic means a communication connection with a second called channel while maintaining the first-mentioned communication connection and continuing the cyclic scanning.

34. An exchange system for a plurality of channels, comprising a cathode ray tube having electrodes in which said channels terminate, means for continuously and cyclically scanning said electrodes by the beam of the tube, and means responsive to the initiation of a call on a channel for establishing and maintaining over the beam of the tube a communication connection with a called channel while continuing the cyclic scanning.

35. The exchange system according to claim 34, and in which the means responsive comprises a normally ineffective multi-electrode discharge tube, and a circuit for rendering said tube effective only when the beam scans the electrode of the calling channel.

36. The exchange system according to claim 34, and in which the means responsive comprises a normally ineffective multi-electrode discharge tube, and a circuit for rendering said tube effective only when the beam scans the electrode of the called channel.

37. An exchange system according to claim 34, and a second means responsive to the initiation of a call on a second channel for establishing and maintaining over the beam of the tube a communication connection with a second called channel while maintaining the first-mentioned communication connection and continuing the cyclic scanning.

38. An exchange system for a plurality of channels, comprising electronic means for continuously and cyclically scanning said channels, a first normally inactive means responsive to the initiation of a call on a channel for establishing and maintaining over said electronic means a communication connection with a called channel while continuing said cyclic scanning, a second normally inactive means responsive to the initiation of a call on a second channel while the first means is in use for establishing and maintaining over said electronic means a communication connection with a second called channel while maintaining the first mentioned communication connection and continuing the cyclic scanning.

39. An exchange system according to claim 38, and in which the first and second responsive means each comprises a normally ineffective multi-electrode discharge tube, circuits for rendering one of said tubes effective only when the first calling channel is scanned, and circuits for rendering the other tube effective only when the second calling channel is scanned.

40. An exchange system according to claim 38, and in which the first and second responsive means each comprises a normally ineffective multi-electrode discharge tube, circuits for rendering one of said tubes effective only when the first called channel is scanned, and circuits for rendering the other tube effective only when the second called channel is scanned.

41. An exchange system comprising a plurality of lines, means for cyclically scanning said lines, and means responsive to the initiation of calls on two lines and to the continued scanning of said lines for establishing and maintaining over the first-mentioned means communication connections between each calling line and a separate called line.

42. An exchange system comprising a plurality of lines, a cathode ray tube having an electrode for each line, means for cyclically scanning said electrodes one after the other by the beam of the tube, and means responsive to the initiation of calls on two lines and to the continued scanning of said electrodes for establishing and maintaining over the beam of the tube communication connections between each calling line and a separate called line.

43. An exchange system comprising a plurality of lines, a cathode ray tube scanning means for cyclically scanning said lines, a plurality of electronic link circuits, and electronic means including said cathode ray tube and responsive to initiation of a call on one of said lines for establishing and maintaining a communication connection of said line and one of said link circuits for the duration of said call.

44. An exchange system according to claim 43, and in which each one of a plurality of subscribers' stations is provided with control switches, signaling means to indicate called numbers and communication transmitting and receiving means, terminal connections for each station in the scanning means, said means responsive comprising a multi-electrode discharge tube constituting a line finder means in each link circuit arranged to respond to said scanning means for establishing energy transfer coupling to the calling line and for effectively blocking others of the line finder means from coupling to said calling line.

45. An exchange system according to claim 43, a calling device associated with each line variably operable in accordance with the number of the line called, and electronic means responsive to the calling device for establishing and maintaining a communication connection between the called line and the link circuit.

46. An exchange system according to claim 43, and in which the electronic means comprises a signal register means having a group of multi-electrode discharge tubes and coupled to each link circuit, circuits for variably operating the group of tubes of the register associated with the link circuit taken into use in accordance with the calling device indicative of the called number, a variable time displacement means coupled to each link circuit, multi-electrode discharge tube means for adjusting said time displacement means under the control of the register means to provide an effective time displacement substantially equal to the time difference between the calling line and said called line, means for controlling the beam intensity of the cathode ray tube and a multi-electrode discharge tube means for coupling said time displacement means to the beam intensity control means whereby communication connection is established between the calling and the called lines.

47. A telephone exchange system comprising a plurality of lines, a cathode ray tube scanning means for cyclically scanning said lines, a plurality of normally inactive electronic link circuits, electronic means responsive to initiation of a call on one of said lines for establishing and maintaining a communication connection between the calling line and a first link circuit over the cathode ray tube, and electronic means responsive to the initiation of a call on a second line while the first link circuit is in use for establishing and maintaining a communication connection between the second calling line and a second link circuit over the cathode ray tube.

48. An exchange system according to claim 47, a calling device associated with each line variably operable in accordance with the number of the called line, and electronic means for each link circuit responsive to any calling device for establishing and maintaining a communication connection between the called line and the associated link circuit.

49. An exchange system comprising a plurality of lines, distributor means for continuously and cyclically scanning said lines, a link circuit means, means responsive to initiation of a call on any one of said lines for establishing and maintaining over said distributor a communication connection between the calling line and the link circuit, and means for establishing and maintaining over said distributor a communication connection between said link circuit and the called line.

50. An exchange system according to claim 49, a second link circuit means, and means operative while said connection is maintained for establishing and maintaining over said distributor a communication connection between a second calling line and the second link circuit means.

51. An exchange system according to claim 49, a second link circuit means, and means operative while said connection is maintained for establishing and maintaining over said distributor a communication connection between the second link circuit and another called line.

52. An exchange system comprising a plurality of lines, distributor means for continuously and cyclically scanning said lines, a plurality of normally inactive link circuit means, means responsive to initiation of a call on any one of said lines for establishing and maintaining over said distributor a communication connection between the calling line and an inactive link circuit, and means for establishing and maintaining over said distributor a communication connection between the link circuit taken into use and the called line.

53. The system according to claim 52, and in which each line has associated with it a calling device variably operable in accordance with the called number, and numerically operable means responsive to the calling device of the calling line for controlling the operation of the means for connecting the link circuit with the called line.

54. An exchange system according to claim 52, and means operative while said connection is maintained for establishing and maintaining over said distributor a communication connection between a second calling line and a second link circuit.

55. An all electronic exchange system comprising a plurality of subscribers' stations each provided with control switches, signaling means to indicate called numbers and communication transmitting and receiving means, cathode ray tube means having an electrode for each station, a beam producing means, beam deflection control means and beam intensity control means, means for producing a deflection potential coupled to said deflection control means to scan said beam cyclically over said electrodes at a rate relatively high with respect to the frequencies of said signals and said communications, means responsive to calling operation of each of said control switches for conditioning the associated electrode for response to said beam, a plurality of link circuits, a multi-electrode discharge tube constituting a line finder means in each said link circuit, each being arranged to respond to the conditioning of said electrodes for establishing energy transfer coupling to the calling line and for effectively blocking others of the line finder means from coupling to said calling line, a signal register means coupled to each line finder means, circuits for variably operating the register associated with the line finder taken into use in accordance with the signaling means indicative of the called subscriber's number, a variable time displacement means coupled to each line finder means, means for adjusting said time displacement means under the control of the register means to provide an effective time displacement substantially equal to the time difference between the calling line and said called line as indicated by the respective positions in the deflection cycle of said beam, and means for coupling said time displacement means to said beam intensity control means whereby communication connection is established between the calling and the called subscriber's line.

56. An all electronic telephone exchange system in which a plurality of subscribers' stations each provided with control switches, signaling means to indicate called numbers and communication transmitting and receiving means are each coupled by a line to the exchange system; comprising terminal connections for each of said lines, cathode ray tube means having discharge means coupled to each of said terminals, a beam producing means, beam deflection control means and beam intensity control means, means for producing a deflection potential coupled to said deflection control means to scan said beam cyclically over said discharge means at a rate relatively high with respect to the frequencies of said signals and said communications, means responsive to calling operation of each of said control switches for conditioning the associated discharge device for response to said beam, a plurality of link circuits, a multi-electrode discharge tube constituting a line finder means in each said link circuit, each being arranged to respond to said discharge means for establishing energy transfer coupling to the calling line and for effectively blocking others of the line finder means from coupling to said calling line, a signal register means comprising a group of multi-electrode discharge tubes and coupled to each line finder means, circuits for variably operating the group of tubes of the register associated with the line finder taken into use in accordance with the signaling means indicative of the called subscriber's number, a variable time displacement means coupled to each line finder means, multi-electrode discharge tube means for adjusting said time displacement means under the control of the register means to provide an effective time displacement substantially equal to the time difference between the calling line and said called line as indicated by the respective positions in the deflection cycle of said beam, and a multi-electrode discharge tube means for coupling said time displacement means to said beam intensity control means whereby communication connection is established between the calling and the called subscriber's line.

EDMOND M. DELORAINE.

No references cited.